(12) United States Patent
Park

(10) Patent No.: US 11,543,998 B2
(45) Date of Patent: Jan. 3, 2023

(54) MEMORY CONTROLLER FOR CONTROLLING DIFFERENT NUMBERS OF MEMORY DEVICES AND STORAGE DEVICE INCLUDING THE SAME

(71) Applicant: SK hynix Inc., Gyeonggi-do (KR)

(72) Inventor: Soo Jin Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/036,791

(22) Filed: Sep. 29, 2020

(65) Prior Publication Data

US 2021/0326061 A1    Oct. 21, 2021

(30) Foreign Application Priority Data

Apr. 17, 2020  (KR) .................. 10-2020-0046868

(51) Int. Cl.
*G06F 3/06* (2006.01)

(52) U.S. Cl.
CPC ............ *G06F 3/0658* (2013.01); *G06F 3/061* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 9,158,700 B2 | 10/2015 | Goss et al. | |
| 9,223,693 B2 | 12/2015 | Sinclair et al. | |
| 2014/0189210 A1* | 7/2014 | Sinclair | G06F 12/0246 711/103 |
| 2015/0113203 A1* | 4/2015 | Dancho | G06F 3/0653 711/102 |
| 2017/0109050 A1* | 4/2017 | Yao | G06F 12/0246 |
| 2018/0081594 A1* | 3/2018 | Jung | G06F 13/00 |
| 2020/0089424 A1* | 3/2020 | Klein | G11C 29/74 |

\* cited by examiner

*Primary Examiner* — Jane W Benner
(74) *Attorney, Agent, or Firm* — IP & T Group LLP

(57) ABSTRACT

A storage device includes first and second memory devices, and a memory controller. The first memory devices correspond to a main data area. The second memory devices correspond to a reserved area. The memory controller is coupled to the first and second memory devices through first and second channels. A number of first memory devices coupled to the memory controller through the first channel is equal to a number of first memory devices coupled to the memory controller through the second channel, and a number of second memory devices coupled to the memory controller through the first channel is different from a number of second memory devices coupled to the memory controller through the second channel. The memory controller selects a memory device on which a write operation is to be performed, based on a memory state of the first and second memory devices.

18 Claims, 16 Drawing Sheets

MEMORY CONTROLLER FOR CONTROLLING DIFFERENT NUMBERS OF MEMORY DEVICES AND STORAGE DEVICE INCLUDING THE SAME

CROSS-REFERENCE TO RELATED APPLICATION

The present application claims priority under 35 U.S.C. § 119(a) to Korean patent application number 10-2020-0046868, filed on Apr. 17, 2020, which is incorporated herein by reference in its entirety.

BACKGROUND

1. Field of Invention

One or more embodiments disclosed herein relate to a memory controller and a storage device having a memory controller.

2. Description of Related Art

A storage device is a device configured to store data under the control of a host device such as a computer, a smart phone or a smart pad. The storage device includes a device configured to store data on magnetic disks (e.g., such as Hard Disk Drives) and a device configured to store data on semiconductor memories (e.g., Solid State Drives (SSDs) or a memory cards).

The storage device may include a memory device configured to store data and a memory controller may manage data storage operations for the one or more memory devices.

The memory devices may be volatile or nonvolatile memory devices. Examples of nonvolatile memory devices includes a Read Only Memory (ROM), a Programmable ROM (PROM), an Electrically Programmable ROM (EPROM), an Electrically Erasable and Programmable ROM (EEPROM), a flash memory, a Phase-change RAM (PRAM), a Magnetic RAM (MRAM), a Resistive RAM (RRAM), and a Ferroelectric RAM (FRAM).

SUMMARY

Embodiments provide a memory controller capable of efficiently performing a data storage operation in a multi-channel and multi-way structure, and a storage device having the memory controller.

In accordance with an aspect of the present disclosure, there is provided a storage device including: a plurality of first memory devices corresponding to a main data area; a plurality of second memory devices corresponding to a reserved area; and a memory controller coupled to the first and second memory devices through first and second channels, wherein a number of first memory devices coupled to the memory controller through the first channel is equal to a number of first memory devices coupled to the memory controller through the second channel, wherein a number of second memory devices coupled to the memory controller through the first channel is different from a number of second memory devices coupled to the memory controller through the second channel, and wherein the memory controller selects a memory device, on which a write operation is to be performed among the first and second memory devices, based on a memory state of the first and second memory devices.

In accordance with another aspect of the present disclosure, there is provided a memory controller coupled to a plurality of main memory devices and a plurality of reserved memory devices through first and second channels, the memory controller including: a memory state monitor configured to monitor memory state information as information on a current state of the main memory devices and the reserved memory devices; and a write operation controller configured to select a memory device on which a write operation is to be performed among the plurality of main memory devices and the plurality of reserved memory devices, based on the memory state information, wherein numbers of main memory devices coupled respectively through the first and second channels are equal to each other, and numbers of reserved memory devices respectively coupled through the first and second channels are different from each other.

In accordance with still another aspect of the present disclosure, there is provided a method for operating a memory controller coupled to a plurality of memory devices through first and second channels, the method including: determining that a write operation on the memory devices is to be performed; selecting a memory device on which the write operation is to be performed among the plurality of memory devices, based on a memory state of the plurality of memory devices; and generating a program command for controlling the selected memory device to perform the write operation, wherein the plurality of memory devices include first memory devices used as a main data area and second memory devices used as a reserved area, wherein a number of first memory devices coupled to the memory controller through the first channel is equal to that of first memory devices coupled to the memory controller through the second channel, and a number of second memory devices coupled to the memory controller through the first channel is different from that of second memory devices coupled to the memory device through the second channel.

In accordance with still another aspect of the present disclosure, there is provided an apparatus including: a first channel output coupled to a first number of first memory devices and a second number of second memory devices; a second channel output coupled to a third number of first memory devices and a fourth number of second memory devices, the first memory devices corresponding a main storage area and the second memory devices corresponding to a reserved storage area; and a memory controller configured to output a signal through the first channel output or the second channel output to select a corresponding one of the first memory devices or the second memory devices, wherein the memory controller generates the signal based on a memory state of the first and second memory devices and wherein one of the second number and the fourth number is zero or greater.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present.

Like reference numerals refer to like elements throughout.

Figure 1:
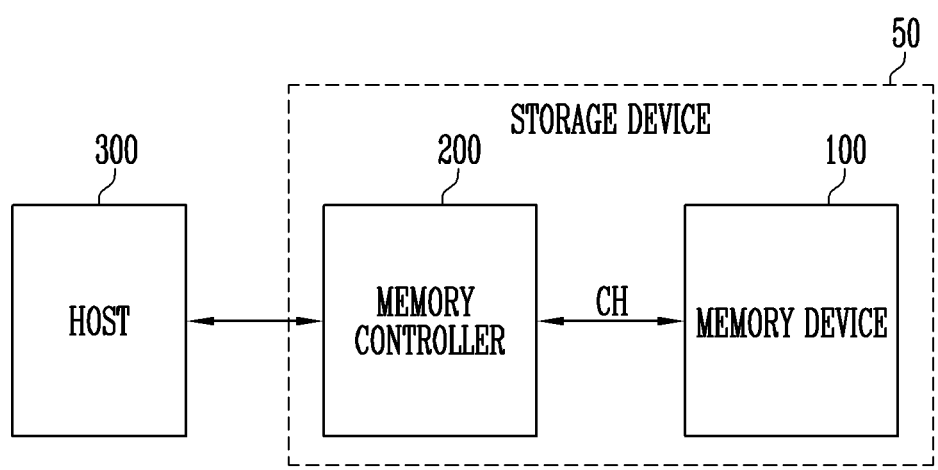
Figure 2:
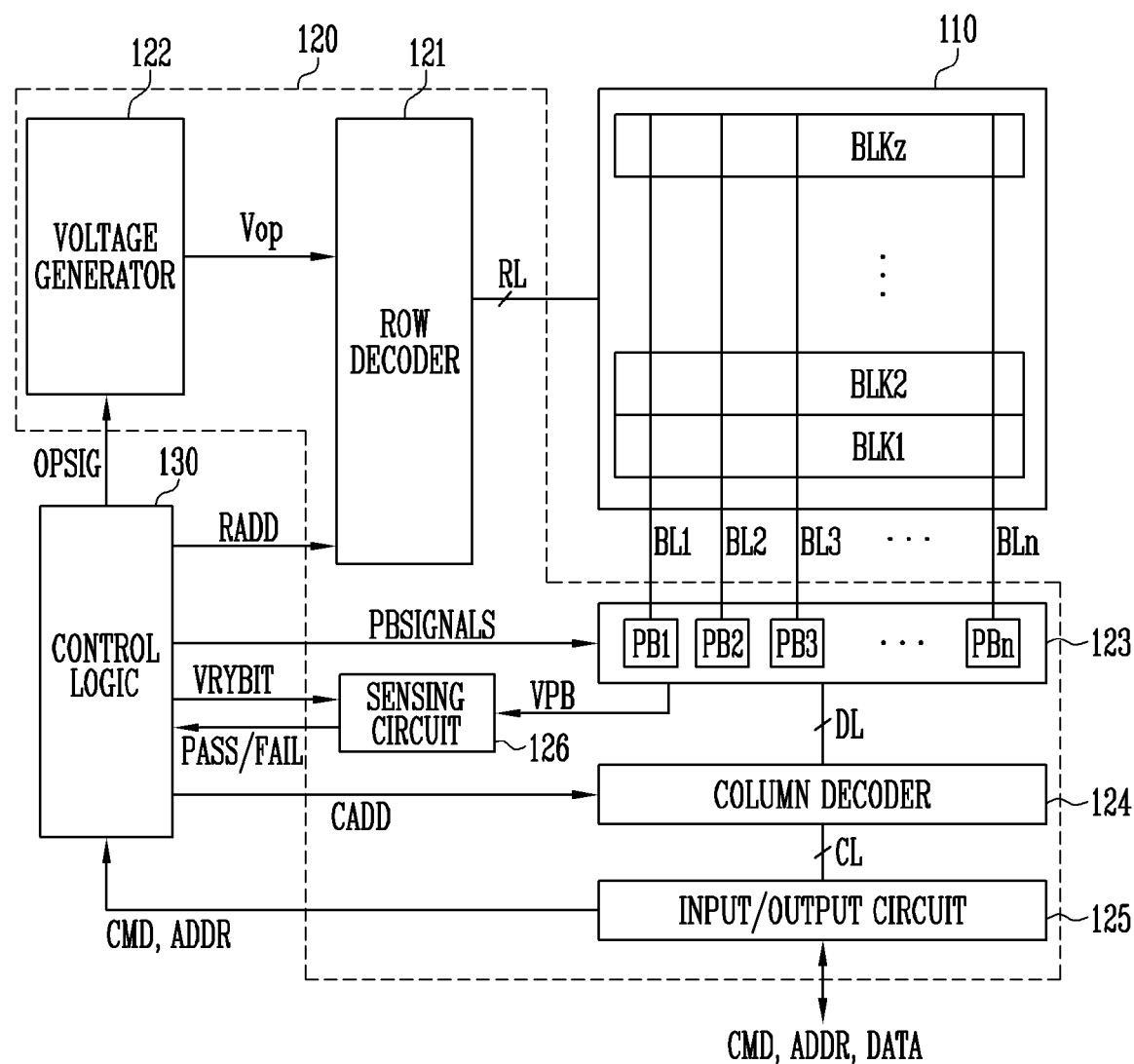
Figure 3:
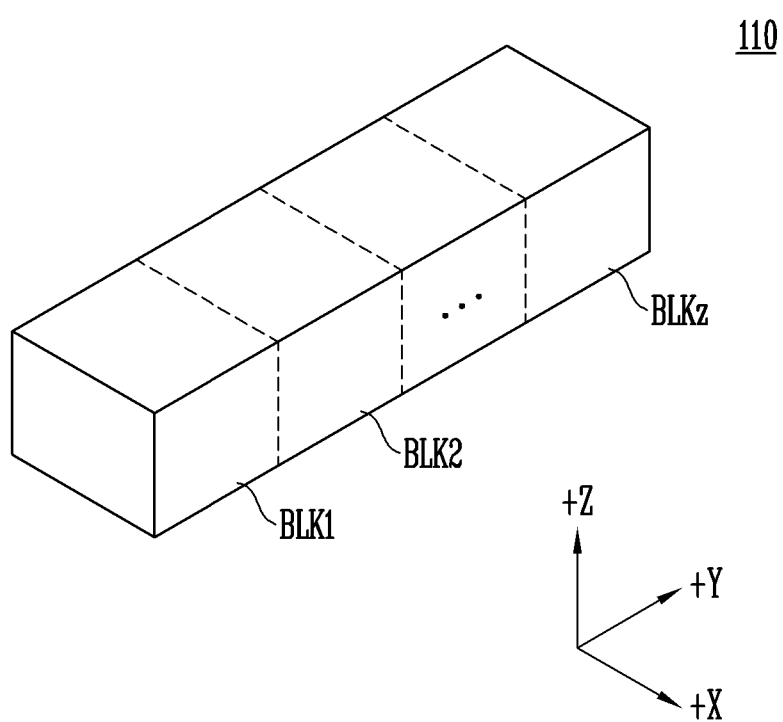
Figure 4:
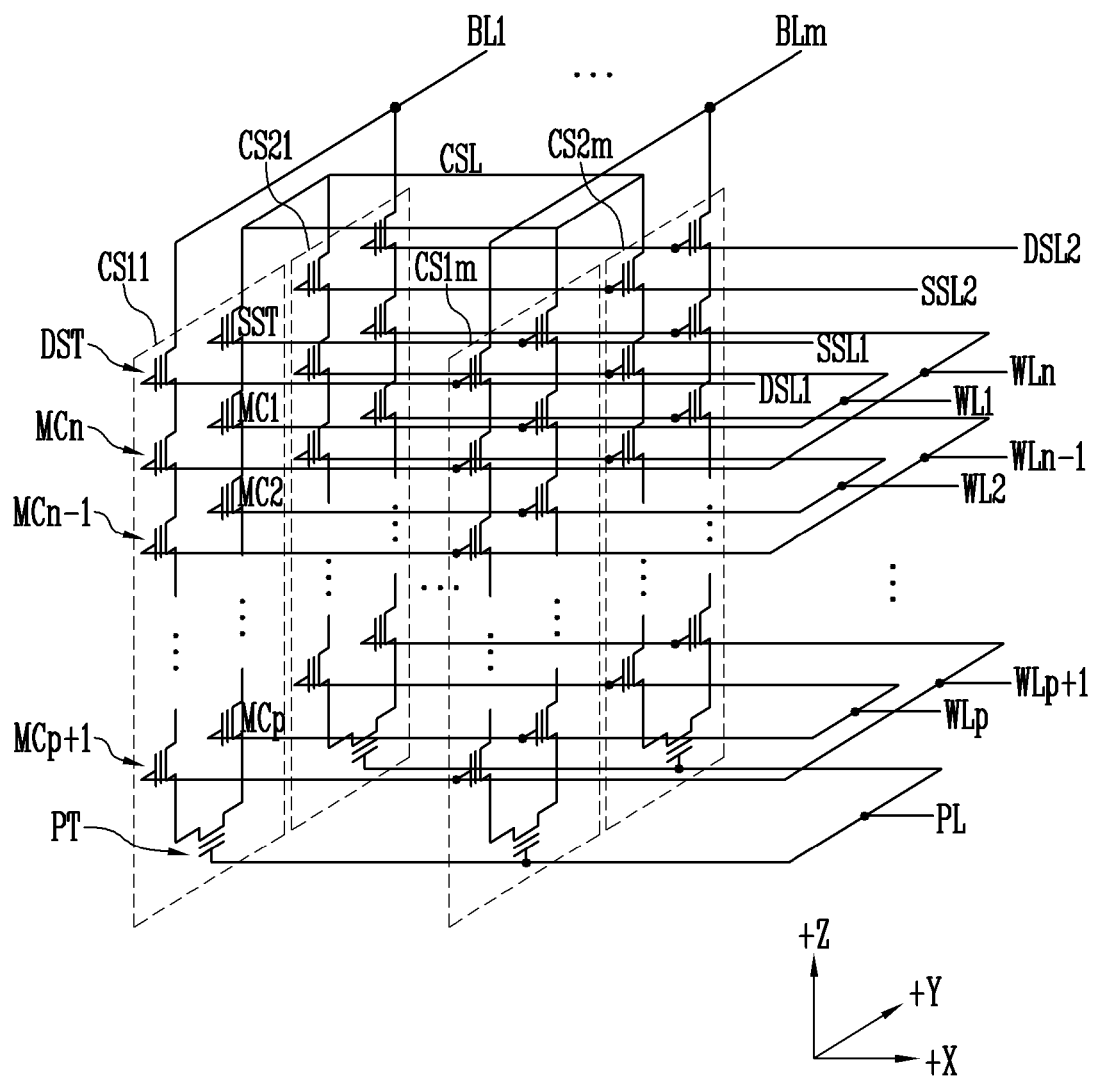
Figure 5:
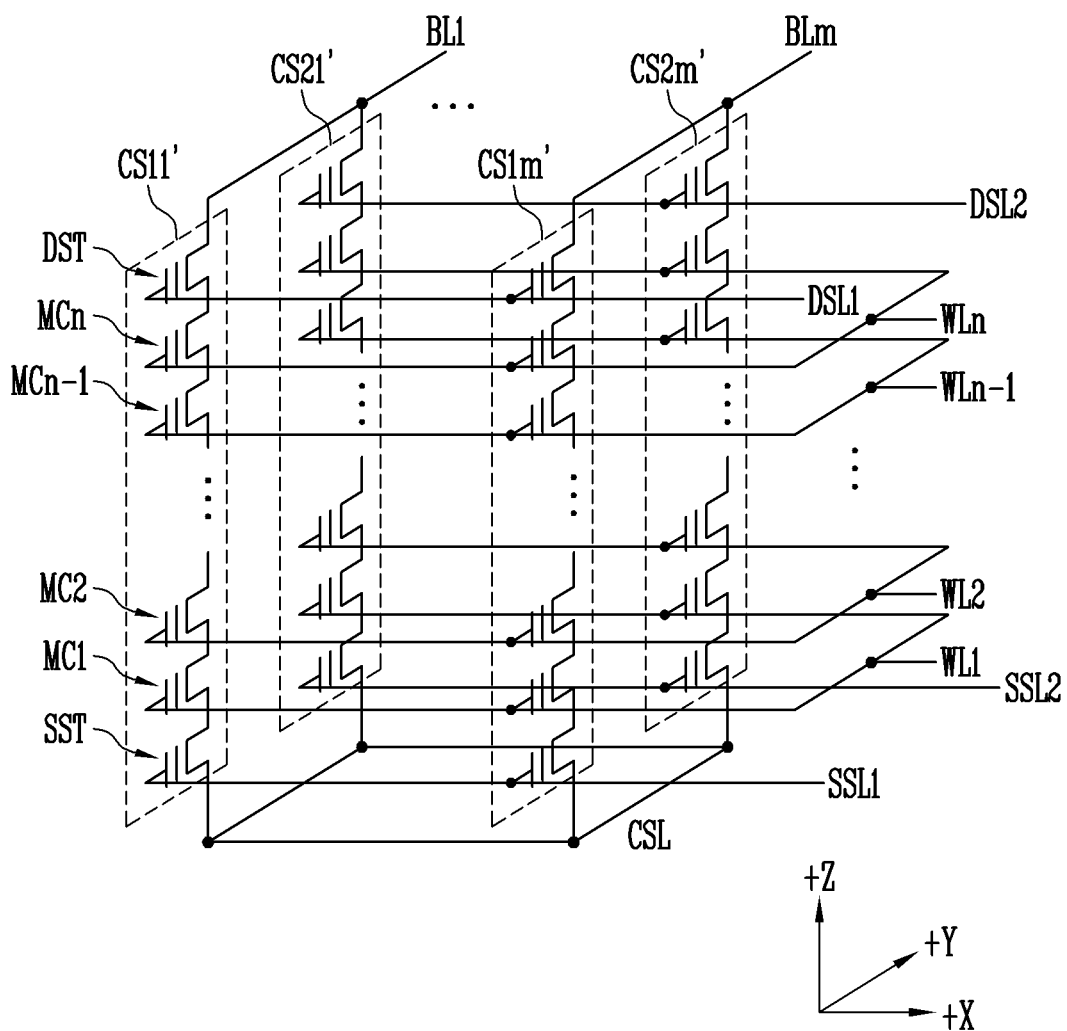
Figure 6:
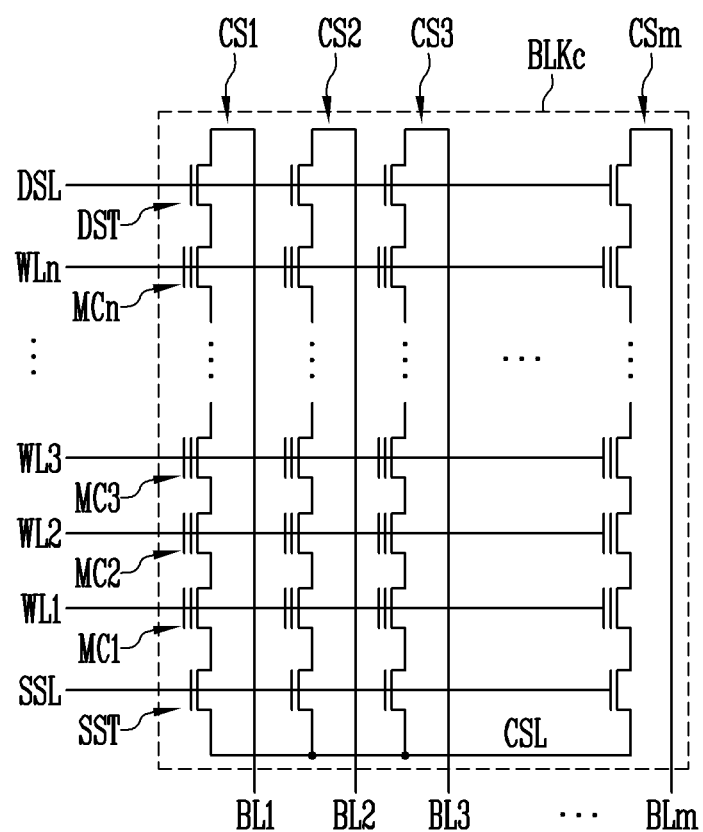
Figure 7:
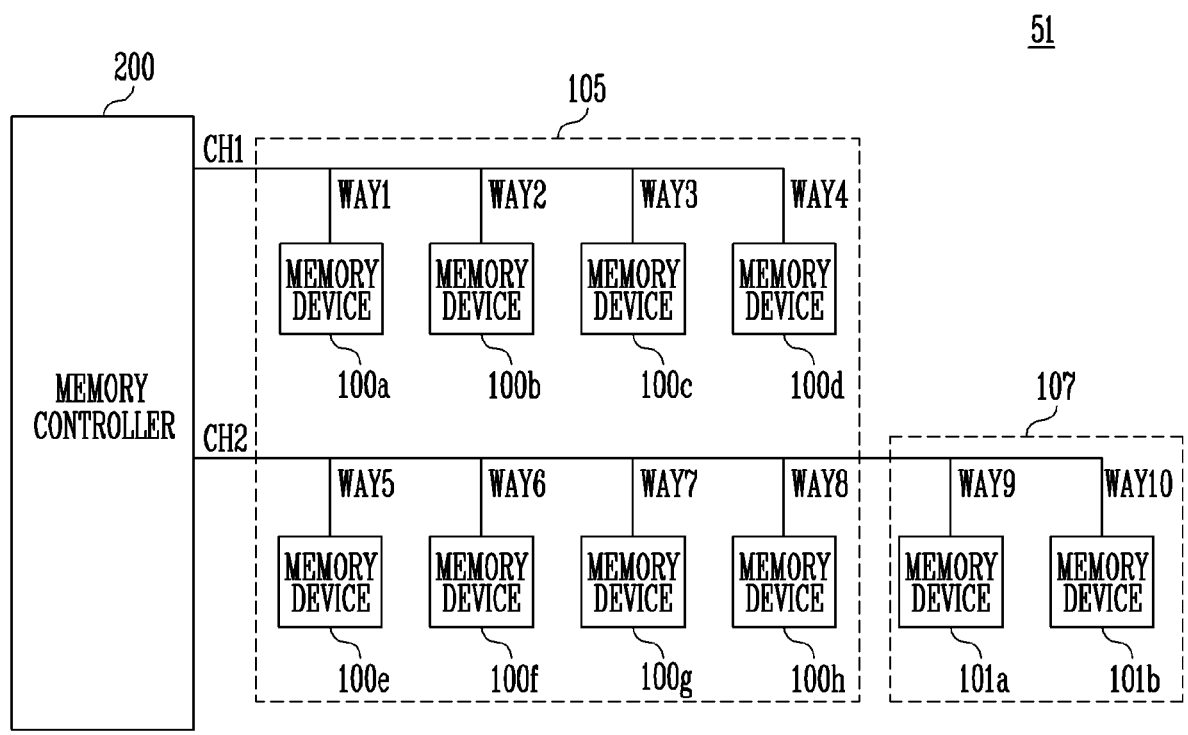
Figure 8:
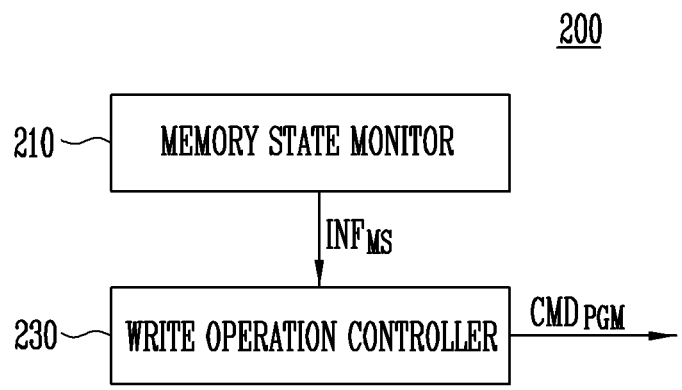
Figure 9:
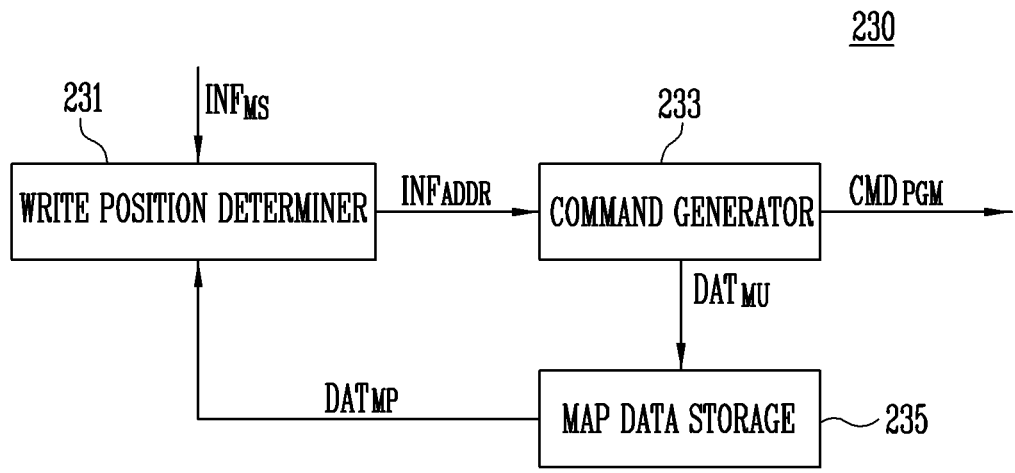
Figure 10:
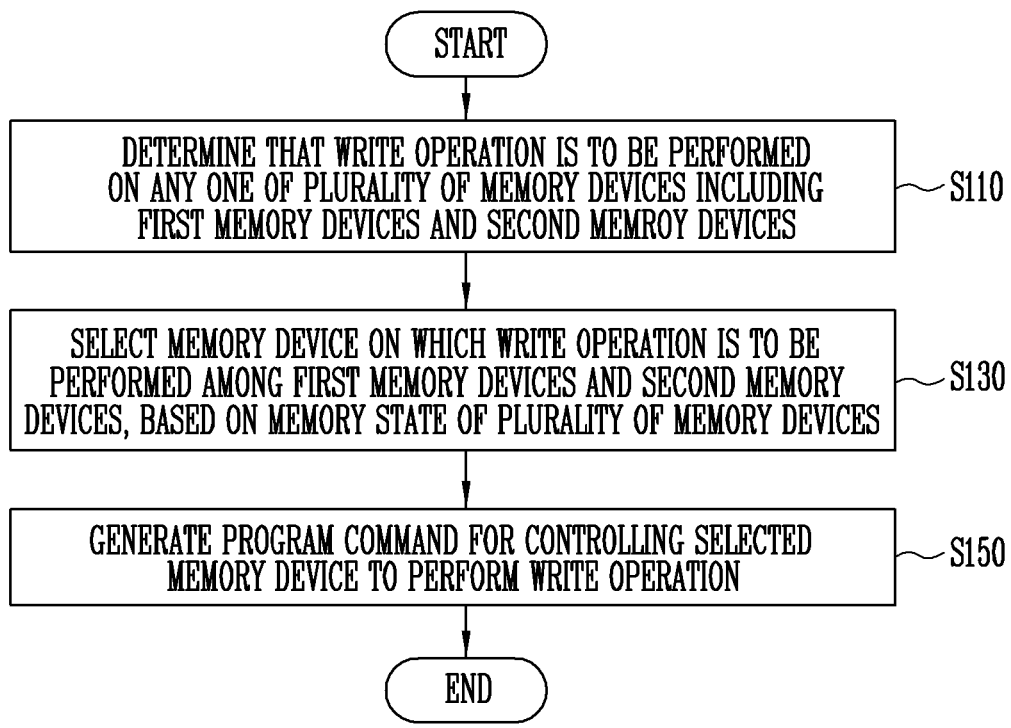
Figure 11:
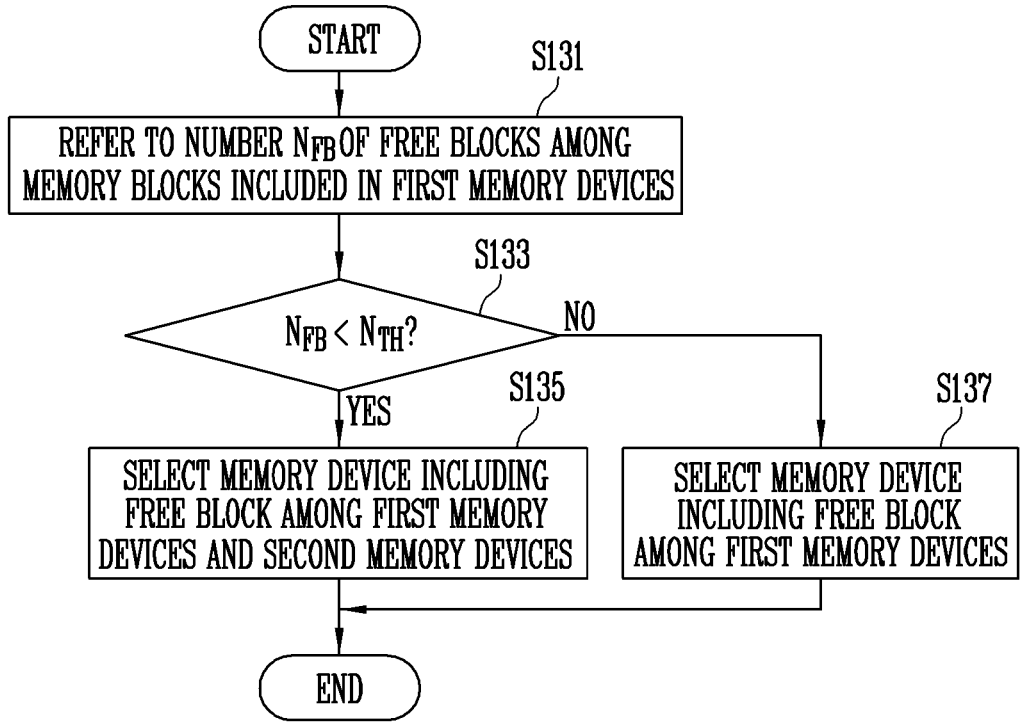
Figure 12A:
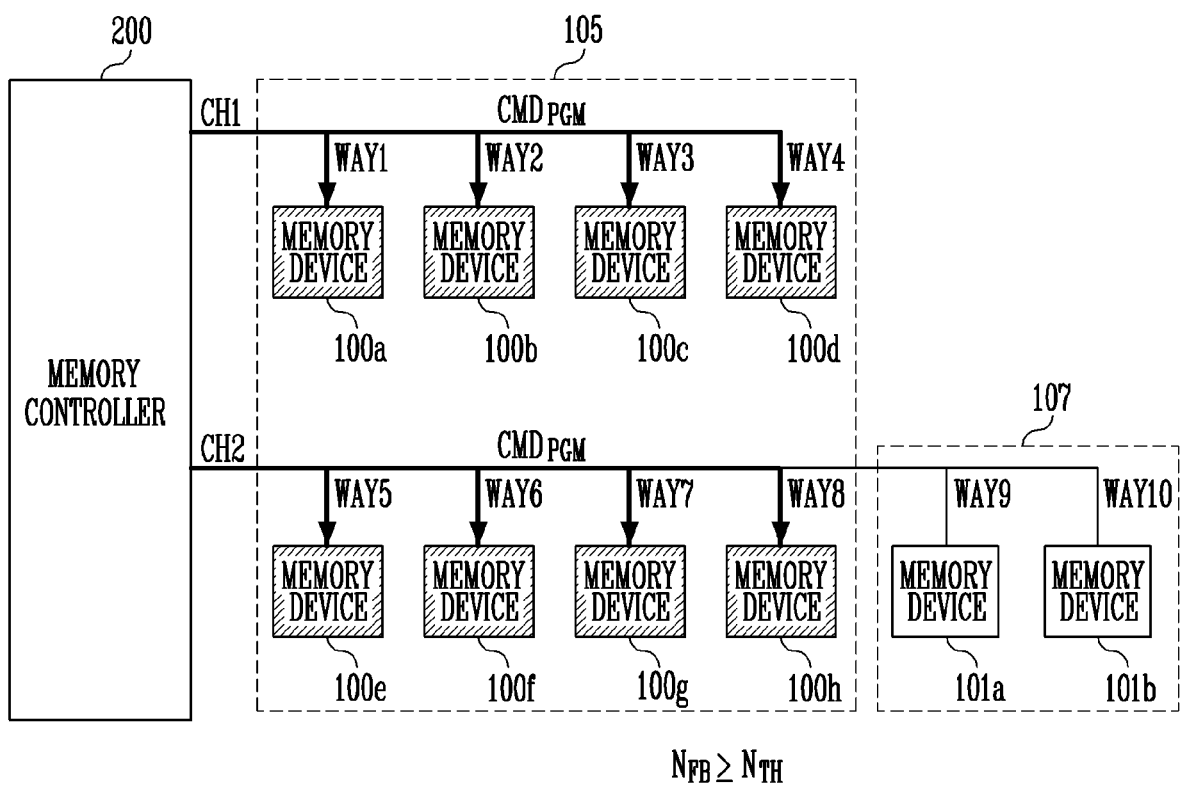
Figure 12B:
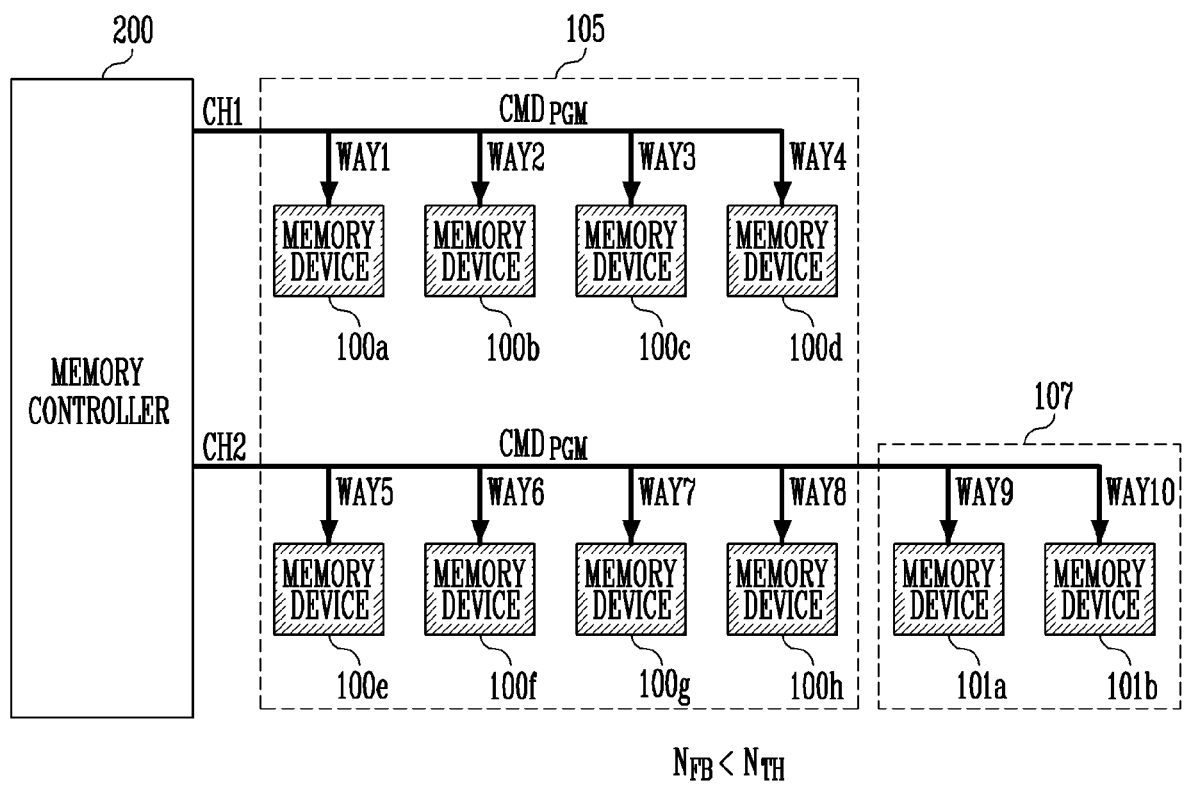
Figure 13:
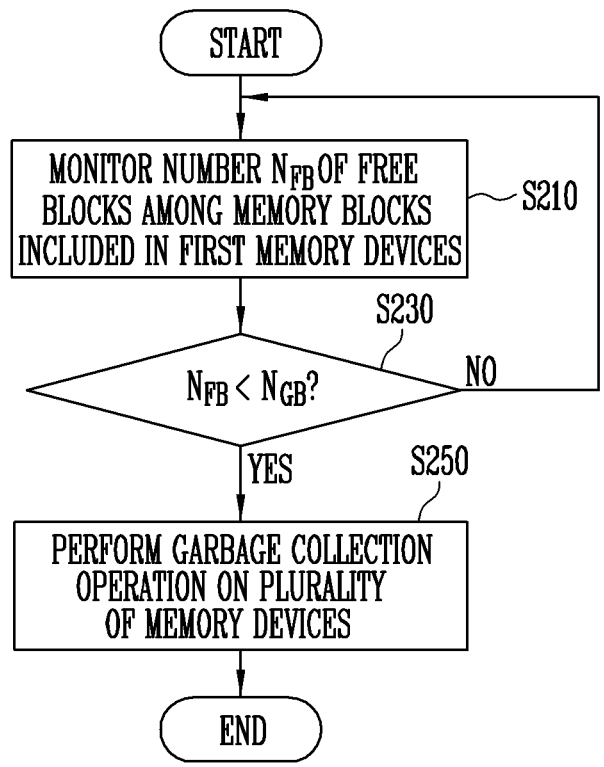
Figure 14:
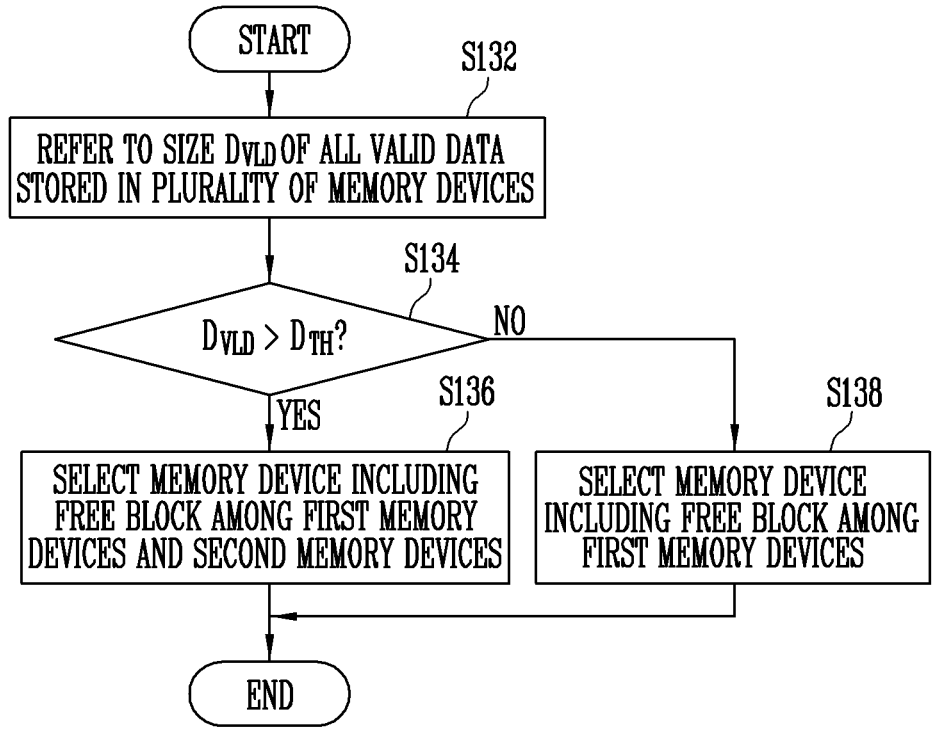
Figure 15:
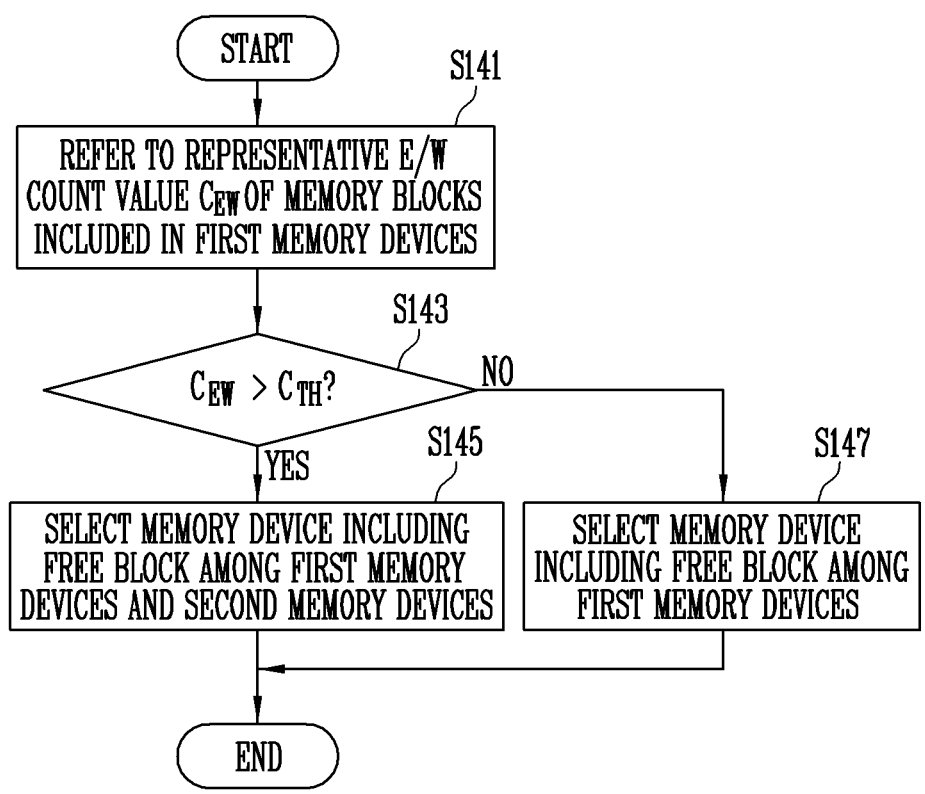
Figure 16:
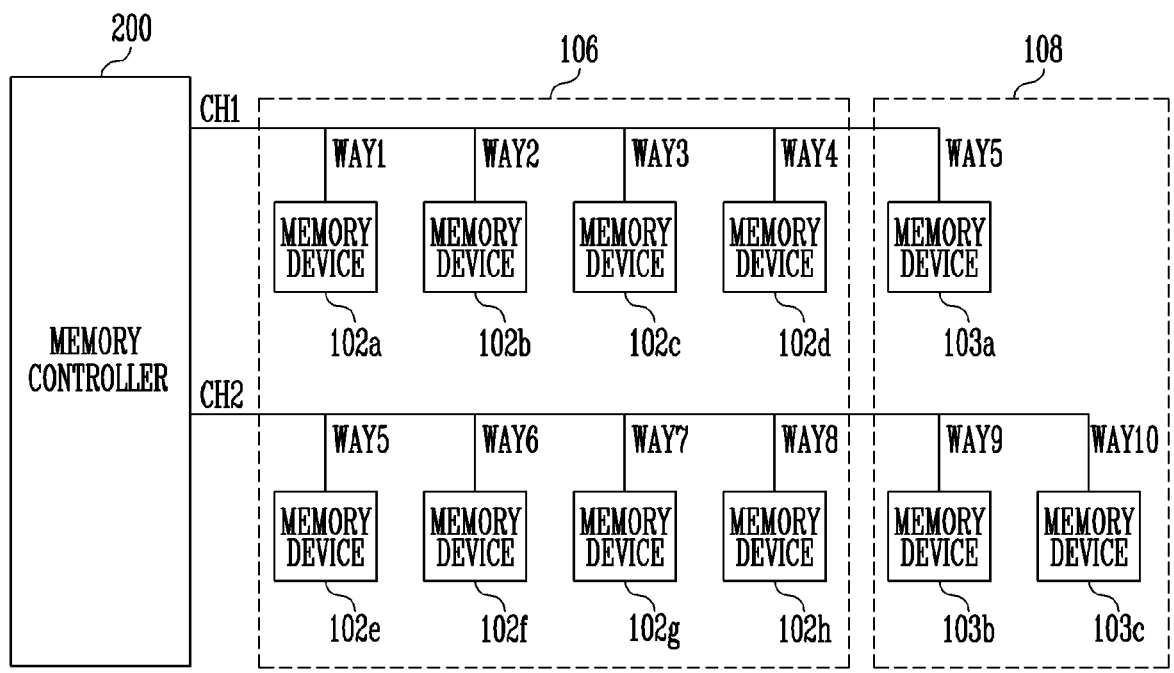
Figure 17:
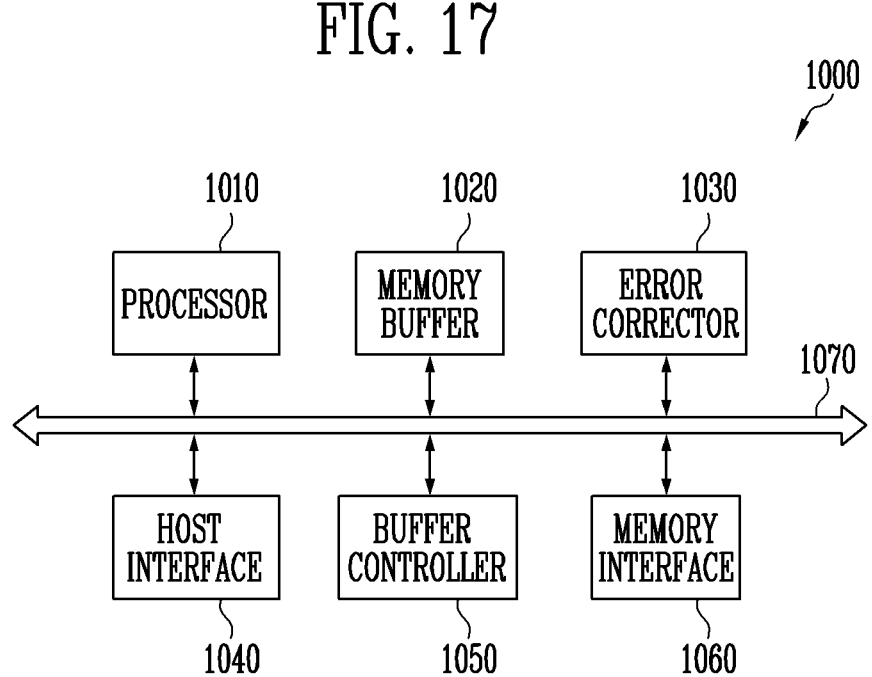
Figure 18:
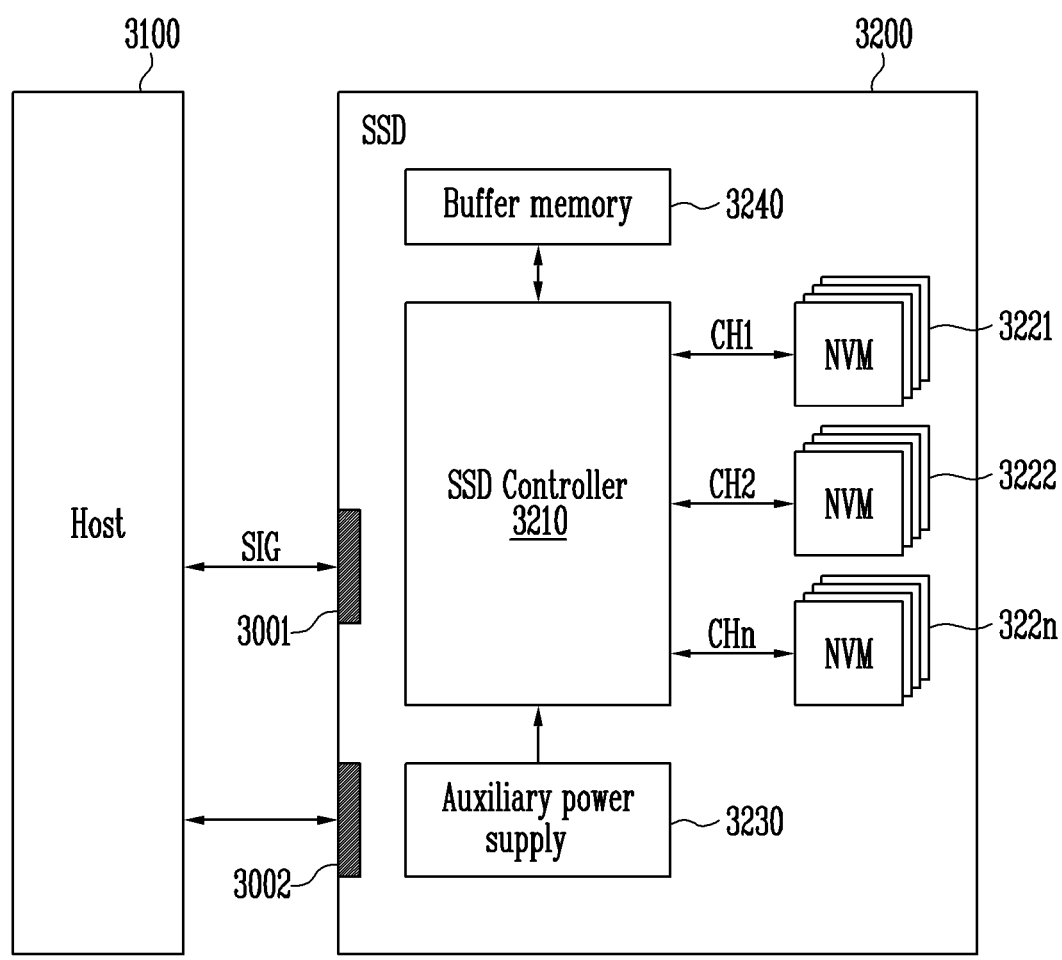
Figure 19:
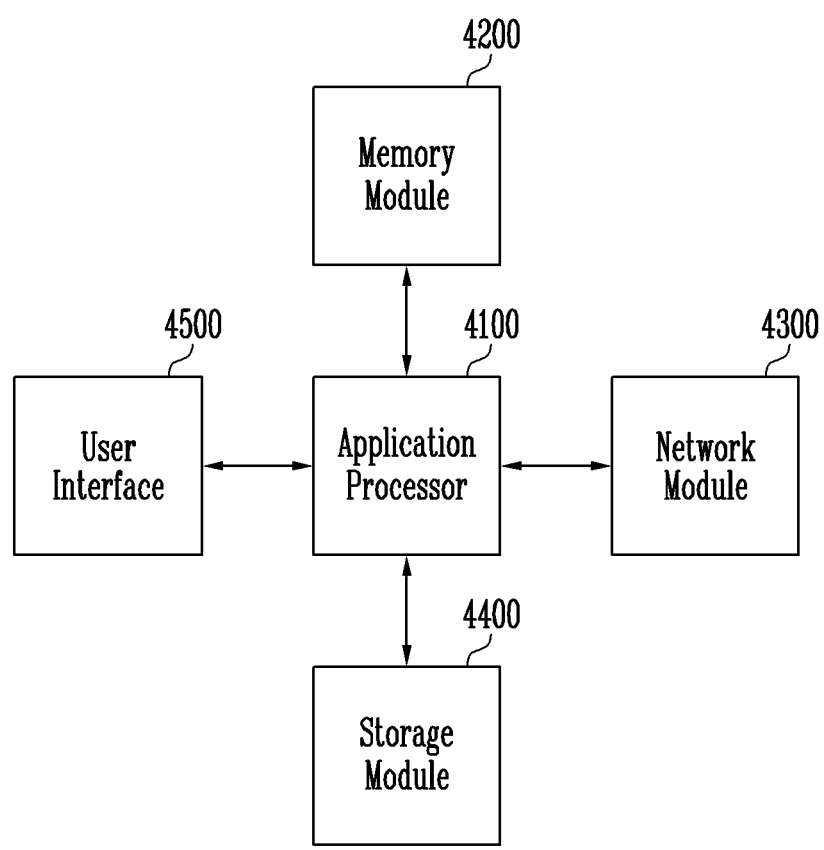

FIG. 1 illustrates an embodiment of a storage device.
FIG. 2 illustrates an embodiment of a memory device.
FIG. 3 illustrates an embodiment of a memory cell array.
FIG. 4 illustrates an embodiment of a memory block.
FIG. 5 illustrates an embodiment of a memory block.
FIG. 6 illustrates an embodiment of a memory block.
FIG. 7 illustrates an embodiment of a storage device.
FIG. 8 illustrates an embodiment of a memory controller.
FIG. 9 illustrates an embodiment of a write operation controller.
FIG. 10 illustrates an embodiment of a method for controlling a storage device.
FIG. 11 illustrates an embodiment of an operation performed by the method of FIG. 10.
FIGS. 12A and 12B illustrate an embodiment of a method for controlling a storage device.
FIG. 13 illustrates an embodiment of a method for starting a garbage collection operation.
FIG. 14 illustrates an embodiment of an operation performed by the method of FIG. 10.
FIG. 15 illustrates an embodiment of an operation performed by the method of FIG. 10.
FIG. 16 illustrates an embodiment of a storage device.
FIG. 17 illustrates an embodiment of a memory controller.
FIG. 18 illustrates an embodiment of a Solid State Drive system.
FIG. 19 illustrates an embodiment of a user system.

DETAILED DESCRIPTION

The specific structural or functional description disclosed herein is merely illustrative for the purpose of describing various embodiments of the present disclosure. Embodiments of the present disclosure can be implemented in various forms, and cannot be construed as limited to the embodiments set forth herein.

FIG. 1 is a block diagram illustrating an embodiment of a storage device 50, which may include a memory device 100 and a memory controller 200. The storage device 50 may store data under the control of and/or transmitted from a host 300. Examples of host 300 include mobile phones, smart phones, MP3 players, laptop computers, desktop computers, game consoles, TVs, tablet PCs, and in-vehicle infotainment.

The storage device 50 may be of various types according to the interface protocol that controls communications with the host 300. For example, the storage device 50 may be implemented as a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), a memory stick, and the like.

The storage device 50 may be manufactured as any one of various kinds of package types. Examples include a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The memory device 100 may store data and may operate under the control of the memory controller 200. The memory device 100 may communicate with the memory controller 200 through at least one channel CH. The memory device 100 may include a memory cell array including a plurality of memory cells for storing data. The memory cell array may include a plurality of memory blocks, each of which may include a plurality of memory cells. The plurality of memory cells may constitute a plurality of pages. In an embodiment, each page may be a unit for storing data in the memory device 100 or reading data stored in the memory device 100. In one embodiment, the memory block may be a unit for erasing data.

Examples of the memory device 100 may include a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. For convenience of description, the memory device 100 may be assumed to be a NAND flash memory.

In an embodiment, the memory device 100 may be implemented in a two-dimensional array structure or three-dimensional array structure. An example of a three-dimensional array structure of the memory device 100 is described below. One or more embodiments may be applied not only to a flash memory device in which a charge storage layer is configured with a Floating Gate (FG), but also to a Charge Trap Flash (CTF) in which a charge storage layer includes an insulating layer.

In an embodiment, the memory device 100 may be operated using a Single Level Cell (SLC) scheme in which one data bit is stored in one memory cell. Alternatively, the memory device 100 may be operated using a scheme in which at least two data bits are stored in one memory cell. For example, the memory device 100 may be operated using a Multi-Level Cell (MLC) scheme in which two data bits are stored in one memory cell, a Triple Level Cell (TLC) scheme in which three data bits are stored in one memory cell, or a Quadruple Level Cell (QLC) scheme in which four data bits are stored in one memory cell.

The memory device 100 is configured to receive commands and addresses from the memory controller 200 through the channel CH, and to access areas selected by the addresses in the memory cell array. That is, the memory device 100 may perform an operation corresponding to a command on the area selected by a corresponding address. For example, the memory device 100 may perform a write (program) operation, a read operation, and an erase operation according to the received command. For example, when a program command is received, the memory device 100 may program data in the area selected by the address. When a read command is received, the memory device 100 may read data from the area selected by the address. When an erase command is received, the memory device 100 may erase data stored in the area selected by the address.

In an embodiment, a plurality of memory devices 100 may be included in the storage device 50. The plurality of memory devices may be coupled to the memory controller 200 through channels CH and may communicate with the memory controller 200 through the channels CH. For example, the memory controller 200 may generate instructions for controlling operations to be performed by each of the plurality of memory devices. Also, each of the plurality of memory devices may output, to the memory controller 200, results obtained by performing the controlled operations.

The memory controller 200 may control overall operations of the storage device 50. When a power voltage is applied to the storage device 50, the memory controller 200 may execute firmware (FW) or other instructions. For example, when the memory device 100 is a flash memory device, the memory controller 200 may execute FW such as a Flash Translation Layer (FTL) for controlling communication between the host 300 and the memory device 100.

In an embodiment, the memory controller 200 may include firmware which receives data and a Logical Block Address (LBA) from the host 300 and which translates the LBA into a Physical Block Address (PBA) representing addresses of memory cells in the memory device 100, in which data is to be stored. Also, the memory controller 200 may store, in a buffer memory, a logical-physical address mapping table which establishes a mapping relationship between the LBA and the PBA.

The memory controller 200 may control the memory device 100 to perform a program operation, a read operation, an erase operation, or the like in response to a request from the host 300. For example, when a program request is received from the host 300, the memory controller 200 may change the program request into a program command and may provide the memory device 100 with the program command, a PBA, and data. When a read request is received together with an LBA from the host 300, the memory controller 200 may change the read request into a read command, select a PBA corresponding to the LBA, and then provide the memory device 100 with the read command and the PBA. When an erase request is received together with an LBA from the host 300, the memory controller 200 may change the erase request into an erase command, select a PBA corresponding to the LBA, and then provide the memory device 100 with the erase command and the PBA.

In an embodiment, the memory controller 200 may autonomously generate a program command, an address, and data without any request from the host 300, and may transmit the program command, the address, and the data to the memory device 100. For example, the memory controller 200 may provide the command, the address, and the data to the memory device 100 to perform background operations such as a program operation for wear leveling and a program operation for garbage collection.

In an embodiment, the storage device 50 may further include the buffer memory. The memory controller 200 may control data exchange between the host 300 and the buffer memory. In one embodiment, the memory controller 200 may temporarily store system data for controlling the memory device 100 in the buffer memory. For example, the memory controller 200 may temporarily store data input from the host 300 in the buffer memory, and may then transmit the data temporarily stored in the buffer memory to the memory device 100.

In various embodiments, the buffer memory may be used as a working memory or cache memory of the memory controller 200. The buffer memory may store codes or commands executed by the memory controller 200. In one embodiment, the buffer memory may store data processed by the memory controller 200. Examples of the buffer memory include a Dynamic Random Access Memory (DRAM) such as a Double Data Rate Synchronous DRAM (DDR SDRAM), a DDR4 SDRAM, a Low Power Double Data Rate 4 (LPDDR4) SDRAM, a Graphics Double Data Rate (GDDR) SRAM, a Low Power DDR (LPDDR), or a Rambus Dynamic Random Access Memory (RDRAM), or a Static Random Access Memory (SRAM).

In various embodiments, the buffer memory may be coupled to the storage device 50 external to the storage device 50. Therefore, volatile memory devices coupled to the storage device 50 external to the storage device 50 may perform functions of the buffer memory. In an embodiment, the memory controller 200 may control at least two memory devices. The memory controller 200 may control the memory devices according to an interleaving method in order to improve operational performance.

The host 300 may communicate with the storage device 50 using one or more communication manners protocols or standards. Examples include a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a Universal Flash Storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

FIG. 2 is a diagram illustrating a structure of memory device 100 shown in FIG. 1. Referring to FIG. 2, the memory device 100 may include a memory cell array 110, a peripheral circuit 120, and a control logic 130.

The memory cell array 110 includes a plurality of memory blocks BLK1 to BLKz coupled to a row decoder 121 through row lines RL and a page buffer group 123 through bit lines BL1 to BLn. Each of the plurality of memory blocks BLK1 to BLKz includes a plurality of memory cells. In an embodiment, the plurality of memory cells may be nonvolatile memory cells. Memory cells coupled to the same word line may be defined as one page. Therefore, one memory block may include a plurality of pages. The row lines RL may include at least one source select line, a plurality of word lines, and at least one drain select line.

Each of the memory cells in the memory cell array 110 may be configured as a Single Level Cell (SLC) storing one data bit, a Multi-Level Cell (MLC) storing two data bits, a Triple Level Cell (TLC) storing three data bits, or a Quadruple Level Cell (QLC) storing four data bits.

The peripheral circuit 120 may perform a program operation, a read operation or an erase operation on a selected region of the memory cell array 110 under the control of the control logic 130. The peripheral circuit 120 may drive the memory cell array 110. For example, the peripheral circuit 120 may apply various operating voltages to the row lines RL and the bit lines BL1 to BLn or discharge the applied voltages under the control of the control logic 130.

The peripheral circuit 120 may include the row decoder 121, the voltage generator 122, the page buffer group 123, a column decoder 124, an input/output circuit 125, and a sensing circuit 126. The row decoder 121 is coupled to the memory cell array 110 through the row lines RL. The row lines RL may include at least one source select line, a plurality of word lines, and at least one drain select line. In an embodiment, the word lines may include normal word lines and dummy word lines. In an embodiment, the row lines RL may further include a pipe select line.

The row decoder 121 decodes row address RADD received from the control logic 130. The row decoder 121 selects at least one memory block among the memory blocks BLK1 to BLKz according to the decoded address. Also, the row decoder 121 may select at least one word line of the selected memory block to apply voltages generated by the voltage generator 122 to the at least one word line WL according the decoded address.

For example, in a program operation, the row decoder 121 may apply a program voltage to the selected word line and apply a program pass voltage (having a level lower than that of the program voltage) to unselected word lines. In a program verify operation, the row decoder 121 may apply a verify voltage to the selected word line and apply a verify pass voltage (having a level higher than that of the verify voltage) to the unselected word lines.

In a read operation, the row decoder 121 may apply a read voltage to the selected word line and apply a read pass voltage (having a level higher than that of the read voltage) to the unselected word lines.

In an embodiment, an erase operation of the memory device 100 is performed in a memory block unit. In the erase operation, the row decoder 121 may select one memory block according to the decoded address. In the erase operation, the row decoder 121 may apply a ground voltage to word lines coupled to the selected memory blocks.

The voltage generator 122 operates under the control of the control logic 130. The voltage generator 122 generates a plurality of voltages by using an external power voltage supplied to the memory device 100. For example, the voltage generator may generate various operating voltages Vop used in program, read, and erase operations in response to an operation signal OPSIG. For example, the voltage generator 122 may generate a program voltage, a verify voltage, a pass voltage, a read voltage, an erased voltage, and the like, under the control of the control logic 130.

In an embodiment, the voltage generator 122 may generate an internal power voltage by regulating the external power voltage. The internal power voltage generated by the voltage generator 122 is used as an operation voltage of the memory device 100.

In an embodiment, the voltage generator 122 may generate a plurality of voltages using the external power voltage or the internal power voltage. For example, the voltage generator 122 may include a plurality of pumping capacitors for receiving the internal power voltage and may generate the plurality of voltages by selectively activating the plurality of pumping capacitors under the control of the control logic 130. The plurality of generated voltages may be supplied to the memory cell array 110 by the row decoder 121.

The page buffer group 123 includes first to nth page buffers PB1 to PBn. The first to nth page buffers PB1 to PBn are coupled to the memory cell array 110 respectively through first to nth bit lines BL1 to BLn. The first to nth bit lines BL1 to BLn operate under the control of the control logic 130. For example, the first to nth bit lines BL1 to BLn may operate in response to page buffer control signals PBSIGNALS. For example, the first to nth page buffers PB1 to PBn may temporarily store data received through the first to nth bit lines BL1 to BLn or sense a voltage or current of the bit lines BL1 to BLn in a read or verify operation.

In a program operation, for example, the first to nth page buffers PB1 to PBn may transfer data DATA received through the input/output circuit 125 to selected memory cells through the first to nth bit lines BL1 to BLn, when a program voltage is applied to a selected word line. Memory cells of a selected page are programmed according to the transferred data DATA. In a program verify operation, the first to nth page buffers PB1 to PBn read page data by sensing a voltage or current received from the selected memory cells through the first to nth bit lines BL1 to BLn.

In a read operation, the first to nth page buffers PB1 to PBn read data DATA from the memory cells of the selected page through the first to nth bit lines BL1 to BLn and outputs the read data DATA to the input/output circuit 125 under the control of the column decoder 124.

In an erase operation, the first to nth page buffers PB1 to PBn may float the first to nth bit lines BL1 to BLn or apply an erase voltage to the first to nth bit lines BL1 to BLn.

The column decoder 124 may communicate data between the input/output circuit 125 and the page buffer group 123 in response to a column address CADD. For example, the column decoder 124 may communicate data with the first to nth page buffers PB1 to PBn through data lines DL or communicate data with the input/output circuit 125 through column lines CL.

The input/output circuit 125 may transfer a command CMD and an address ADDR, which are received from the memory controller (e.g., 200 shown in FIG. 1), to the control logic 130 or exchange data DATA with the column decoder 124.

In a read operation or verify operation, the sensing circuit 126 may generate a reference current in response to an allow bit VRYBIT signal, and output a pass or fail signal PASS/FAIL by comparing a sensing voltage VPB received from the page buffer group 123 and a reference voltage generated by the reference current.

The control logic 130 may control the peripheral circuit 120 by outputting the operation signal OPSIG, the row address RADD, the page buffer control signals PBSIGNALS, and the allow bit VRYBIT in response to the command CMD and the address ADDR. For example, the control logic 130 may control a read operation of a selected memory block in response to a sub-block read command and an address. Also, the control logic 130 may control an erase operation a selected sub-block included in the selected memory block in response to a sub-block erase command and an address. Also, the control logic 130 may determine whether the verify operation has passed or failed in response to the pass or fail signal PASS or FAIL.

Each of the memory cells in the memory cell array 110 may be programmed to any one program state among a plurality of program states according to data stored therein. A target program state of a memory cell may be determined as any one of the plurality of program states according to data stored in the memory cell.

FIG. 3 is a diagram illustrating an embodiment of the memory cell array 110 shown in FIG. 2. Referring to FIG. 3, the memory cell array 110 may include a plurality of memory blocks BLK1 to BLKz. Each memory block may have a three-dimensional structure. Each memory block may include a plurality of memory cells stacked on a substrate. The plurality of memory cells may be arranged along +X, +Y, and +Z directions. An example structure of each memory block will be described in more detail with reference to FIGS. 4 and 5.

FIG. 4 is a circuit diagram illustrating an embodiment of any one memory block BLKa among the memory blocks BLK1 to BLKz shown in FIG. 2. Referring to FIG. 4, the memory block BLKa may include a plurality of cell strings CS11 to CS1m and CS21 to CS2m. In an embodiment, each of the plurality of cell strings CS11 to CS1m and CS21 to CS2m may be formed in a predetermined shape, e.g., 'U' shape or another shape. In the memory block BLKa, m cell strings are arranged in a row direction (e.g., a +X direction). FIG. 4 illustrates two cell strings arranged in a column direction (e.g., a +Y direction). However, this is for convenience of description, and it will be understood that three cell strings may be arranged in the column direction.

Each of the plurality of cell strings CS11 to CS1*m* and CS21 to CS2*m* may include at least one source select transistor SST, first to nth memory cells MC1 to MCn, a pipe transistor PT, and at least one drain select transistor DST. The select transistors SST and DST and the memory cells MC1 to MCn may have structures similar to one another.

In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided in each cell string. In an embodiment, a pillar for providing at least one of the channel layer, the tunneling insulating layer, the charge storage layer, and the blocking insulating layer may be in each cell string.

The source select transistor SST of each cell string may be coupled between a common source line CSL and memory cells MC1 to MCp. In an embodiment, the source select transistors of cell strings arranged on the same row are coupled to a source select line extending in the row direction. The source select transistors of cell strings arranged on different rows are coupled to different source select lines. In FIG. 4, the source select transistors of the cell strings CS11 to CS1*m* on a first row are coupled to a first source select line SSL1. The source select transistors of the cell strings CS21 to CS2*m* on a second row are coupled to a second source select line SSL2. In one embodiment, the source select transistors of the cell strings CS11 to CS1*m* and CS21 to CS2*m* may be commonly coupled to one source select line.

The first to nth memory cells MC1 to MCn of each cell string are coupled between the source select transistor SST and the drain select transistor DST. The first to nth memory cells MC1 to MCn may be divided into first to pth memory cells MC1 to MCp and a (p+1)th to nth memory cells MCp+1 to MCn. The first to pth memory cells MC1 to MCp are sequentially arranged in the opposite direction of a +Z direction and may be coupled in series between the source select transistor SST and the pipe transistor PT. The (p+1)th to nth memory cells MCp+1 to MCn are sequentially arranged in the +Z direction and may be coupled in series between the pipe transistor PT and the drain select transistor DST. The first to pth memory cells MC1 to MCp and the (p+1)th to nth memory cells MCp+1 to MCn are coupled through the pipe transistor PT. Gate electrodes of the first to nth memory cells MC1 to MCn of each cell string are coupled to first to nth word lines WL1 to WLn, respectively. A gate of the pipe transistor PT of each cell string is coupled to a pipe line PL.

The drain select transistor DST of each cell string is coupled between a corresponding bit line and the memory cells MCp+1 to MCn. Cell strings arranged in the row direction are coupled to a drain select line extending in the row direction. The drain select transistors of the cell strings CS11 to CS1*m* on the first row are coupled to a first drain select line DSL1. The drain select transistors of the cell strings CS21 to CS2*m* on the second row are coupled to a second drain select line DSL2.

Cell strings arranged in the column direction are coupled to a bit line extending in the column direction. In FIG. 4, the cell strings CS11 and CS21 on a first column are coupled to a first bit line BL1. The cell strings CS1*m* and CS2*m* on an mth column are coupled to an mth bit line BL*m*.

Memory cells coupled to the same word line in the cell strings arranged in the row direction may constitute one page. For example, memory cells coupled to the first word line WL1 in the cell strings CS11 to CS1*m* on the first row constitute one page. Memory cells coupled to the first word line WL1 in the cell strings CS21 to CS2*m* on the second row constitute another page. As any one of the drain select lines DSL1 and DSL2 is selected, cell strings arranged in one row direction may be selected. As any one of the word lines WL1 to WLn is selected, one page may be selected in the selected cell strings.

In another embodiment, even bit lines and odd bit lines may be provided instead of the first to mth bit lines BL1 to BL*m*. In addition, even-numbered cell strings among the cell strings CS11 to CS1*m* or CS21 to CS2*m* arranged in the row direction may be coupled to the even bit lines, respectively, and odd-numbered cell strings among the cell strings CS11 to CS1*m* or CS21 to CS2*m* arranged in the row direction may be coupled to the odd bit lines, respectively.

In an embodiment, at least one of the first to nth memory cells MC1 to MCn may be used as a dummy memory cell. For example, the at least one dummy memory cell may be provided to decrease an electric field between the source select transistor SST and the memory cells MC1 to MCp. In one embodiment, the at least one dummy memory cell may be provided to decrease an electric field between the drain select transistor DST and the memory cells MCp+1 to MCn. When the number of dummy memory cells increases, the reliability of operation of the memory block BLKa is improved but the size of the memory block BLKa may increase. When the number of dummy memory cells decreases, the size of the memory block BLKa decreases but the reliability of operation of the memory block BLKa may be deteriorated.

In order to efficiently control the at least one dummy memory cell, the dummy memory cells may have a required threshold voltage. Before or after an erase operation of the memory block BLKa, a program operation may be performed on all or some of the dummy memory cells. When an erase operation is performed after the program operation is performed, the threshold voltage of the dummy memory cells control a voltage applied to the dummy word lines coupled to the respective dummy memory cells, so that the dummy memory cells can have the required threshold voltage.

FIG. 5 is a circuit diagram illustrating another embodiment BLKb of the one memory block among the memory blocks BLK1 to BLKz shown in FIG. 2. Referring to FIG. 5, the memory block BLKb may include a plurality of cell strings CS11' to CS1*m*' and CS21' to CS2*m*'. Each of the plurality of cell strings CS11' to CS1*m*' and CS21' to CS2*m*' extends along the +Z direction. Each of the plurality of cell strings CS11' to CS1*m*' and CS21' to CS2*m*' includes at least one source select transistor SST, first to nth memory cells MC1 to MCn, and at least one drain select transistor DST, which are stacked on a substrate under the memory block BLKb.

The source select transistor SST of each cell string is coupled between a common source line CSL and the memory cells MC1 to MCn. The source select transistors of cell strings arranged on the same row are coupled to the same source select line. The source select transistors of the cell strings CS11' to CS1*m*' arranged on a first row are coupled to a first source select line SSL1. Source select transistors of the cell strings CS21' to CS2*m*' arranged on a second row are coupled to a second source select line SSL2. In another embodiment, the source select transistors of the cell strings CS11' to CS1*m*' and CS21' to CS2*m*' may be commonly coupled to one source select line.

The first to nth memory cells MC1 to MCn of each cell string are coupled in series between the source select transistor SST and the drain select transistor DST. Gate electrodes of the first to nth memory cells MC1 to MCn are coupled to first to nth word lines WL1 to WLn, respectively.

The drain select transistor DST of each cell string is coupled between a corresponding bit line and the memory cells MC1 to MCn. The drain select transistors of cell strings arranged in the row direction are coupled to a drain select line extending in the row direction. The drain select transistors of the cell strings CS11' to CS1m' on the first row are coupled to a first drain select line DSL1. The drain select transistors of the cell strings CS21' to CS2m' on the second row are coupled to a second drain select line DSL2.

The memory block BLKb of FIG. 5 may have a circuit configuration similar to that of the memory block BLKa of FIG. 4, except that the pipe transistor PT is excluded from each cell string in FIG. 5.

In one embodiment, even bit lines and odd bit lines may be provided instead of the first to mth bit lines BL1 to BLm. In addition, even-numbered cell strings among the cell strings CS11' to CS1m' or CS21' to CS2m' arranged in the row direction may be coupled to the even bit lines, respectively, and odd-numbered cell strings among the cell strings CS11' to CS1m' or CS21' to CS2m' arranged in the row direction may be coupled to the odd bit lines, respectively.

In an embodiment, at least one of the first to nth memory cells MC1 to MCn may be used as a dummy memory cell. For example, the at least one dummy memory cell may be provided to decrease an electric field between the source select transistor SST and the memory cells MC1 to MCp. In one embodiment, the at least one dummy memory cell may be provided to decrease an electric field between the drain select transistor DST and the memory cells MCp+1 to MCn. When the number of dummy memory cells increases, the reliability of operation of the memory block BLKb is improved but the size of the memory block BLKb is increased. When the number of dummy memory cells decreases, the size of the memory block BLKb decreases but the reliability of operation of the memory block BLKb may be deteriorated.

In order to efficiently control the at least one dummy memory cell, the dummy memory cells may have a required threshold voltage. Before or after an erase operation of the memory block BLKb, a program operation may be performed on all or some of the dummy memory cells. When an erase operation is performed after the program operation is performed, the threshold voltage of the dummy memory cells control a voltage applied to the dummy word lines coupled to the respective dummy memory cells, so that the dummy memory cells can have the required threshold voltage.

FIG. 6 is a circuit diagram illustrating another embodiment BLKc of the one memory block among the plurality of memory blocks BLK1 to BLKz included in the memory cell array 110 shown in FIG. 2.

Referring to FIG. 6, the memory block BLKc includes a plurality of strings CS1 to CSm. The plurality of strings CS1 to CSm may be coupled to a plurality of bit lines BL1 to BLm, respectively. Each of the strings CS1 to CSm includes at least one source select transistor SST, first to nth memory cells MC1 to MCn, and at least one drain select transistor DST.

Each of the select transistors SST and DST and the memory cells MC1 to MCn may have a similar structure. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided in each cell string. In an embodiment, a pillar for providing at least one of the channel layer, the tunneling insulating layer, the charge storage layer, and the blocking insulating layer may be provided in each cell string.

The source select transistor SST of each cell string is coupled between a common source line CSL and the memory cells MC1 to MCn. The first to nth memory cells MC1 to MCn of each cell string is coupled between the source select transistor SST and the drain select transistor DST. The drain select transistor DST of each cell string is coupled between a corresponding bit line and the memory cells MC1 to MCn.

Memory cells coupled to the same word line may constitute one page. When a drain select line DSL is selected, the cell strings CS1 to CSm may be selected. When any one of word lines WL1 to WLn is selected, one page among selected cell strings may be selected.

In one embodiment, even bit lines and odd bit lines may be provided instead of the first to mth bit lines BL1 to BLm. Even-numbered cell strings among the cell strings CS1 to CSm arranged may be coupled to the even bit lines, respectively, and odd-numbered cell strings among the cell strings CS1 to CSm may be coupled to the odd bit lines, respectively.

As shown in FIGS. 3 to 5, the memory cell array 110 of the memory device 100 may be configured as a memory cell array having a three-dimensional structure. Also, as shown in FIG. 6, the memory cell array 110 of the memory device 100 may be configured as a memory cell array having a two-dimensional structure.

FIG. 7 is a diagram illustrating an embodiment of storage device 51 which may include a memory controller 200 and a plurality of memory devices 100a to 100h, 101a, and 101b. The memory controller 200 may be included, for example, in a chip with outputs that correspond to the channels CH1 and CH2 or the outputs may be coupled to logic performing the functions of the memory controller inside of a chip or other circuit. The plurality of memory devices 100a to 100h, 101a, and 101b may constitute a first data area 105 and a second data area 107. First memory devices 100a to 100h may constitute the first data area 105. Second memory devices 101a and 101b may constitute the second data area 107.

In an example, the first data area 105 constituted by the first memory devices 100a to 100h may be a main data area for storing user data. The second data area 107 constituted by the second memory device 101a and 101b may be a reserved area in which the user data is not stored. The reserved area may include an over provisioning area required to maintain operation performance of the storage device 51. The over provisioning area may be a data area which is not used as long as there is no predetermined reason. For example, when a bad block among memory blocks constituting the main data area 105 (e.g., memory blocks in the first memory devices 100a to 100h) is generated while the storage device 51 is being used, the corresponding bad block may not be used any more. Any one of memory blocks constituting the over provisioning area (e.g., memory blocks included in the second memory devices 101a and 101b) may be used in replacement of the bad block.

In one example, the over provisioning area may be a reserved space allocated to enable various functions for driving the storage device (e.g., wear leveling, bad block management, etc.) to be smoothly performed. Since the over provisioning area cannot be accessed by a user, the over provisioning area may be excluded from the user capacity of the storage device 51 in some embodiments.

As shown in FIG. 7, in accordance with the embodiment the storage device 51 may be configured in a multi-channel and multi-way structure. A multi-channel structure may mean a structure in which the memory controller 200 and the memory devices 100a to 100h, 101a, and 101b are coupled through a plurality of channels CH1 and CH2 in order to simultaneously access a plurality of memory devices. The number of memory devices which the memory controller 200 can simultaneously control may increase as the number of channels used to couple the memory controller 200 and the memory devices 100a to 100h, 101a, and 101b increases. Thus, the operating speed of the storage device 51 can be improved.

A multi-way structure may mean a structure in which a plurality of memory devices are coupled to one channel. For example, four memory devices 100a to 100d are coupled to a first channel CH1 of the storage device 51 shown in FIG. 7. Through the first channel CH1, the memory devices 100a to 100d respectively constitute first to fourth ways WAY1 to WAY4. In addition, through a second channel CH2, the memory devices 100e to 100h, 101a, and 101b respectively constitute fifth to tenth ways WAY5 to WAY10. In the storage device having the multi-way structure, a plurality of memory devices coupled to one channel perform an interleaving operation, so that the operating speed of the storage device can be improved.

In one embodiment, each of the channels may include the same number of ways. Also, the same number of memory devices may be coupled for each channel. For example, the same number of main memory devices and the same number of reserved memory devices may be coupled for each channel. The main memory device may correspond, for example, to a memory device constituting a main data area. Meanwhile, the reserved memory device may correspond, for example, to a memory device constituting a reserved area.

In one embodiment, the same number of ways may be configured for each channel, in order to allow for efficient performance of management of memory devices. For example, when the same number of ways is configured for each channel, the memory controller 200 may efficiently use channels by distributing the workload, e.g., write operations alternately with respect to the channels. When channels are configured with different numbers of ways, the numbers of memory devices coupled per channel may be different from each other. Hence, when the memory controller 200 distributes workload with respect to the channels, the case may frequently occur where the workload is concentrated on one or more channels while one or more other channels are in an idle state. Therefore, the channels are inefficiently used.

However, there may occur a case where different numbers of reserved memory devices constituting a reserved area are coupled with respect to channels based on cost or design requirements. Although the same number of main memory devices may be coupled for each channel, the numbers of all memory devices coupled with respect to channels may be different from each other.

In accordance with one embodiment, as shown in the storage area 51 of FIG. 7, the same number of main memory devices may be coupled for each channel, e.g., four main memory devices 100a to 100d are coupled through the first channel CH1, and four main memory devices 100e to 100h are coupled through the second channel CH2. However, in accordance with one embodiment, different numbers of preliminary or reserved memory devices may be coupled with respect to the channels in storage device 51. In FIG. 7, no reserved memory device(s) are coupled through first channel CH1 and two reserved memory devices 101a and 101b are coupled through the second channel CH2.

In accordance with one embodiment, in storage device 51, the memory controller 200 may be coupled to the memory devices 100a to 100h, 101a, and 101b through the plurality of channels CH1 and CH2. In an embodiment, the numbers of memory devices coupled with respect to the channels CH1 and CH2 may be different from each other. In an example, the number of reserved memory devices 101a and 101b coupled with respect to the channels CH1 and CH2 may be different from each other. Meanwhile, numbers of main memory devices 100a to 100h coupled with respect to the channels CH1 and CH2 may be the same.

In accordance with one embodiment, the memory controller 200 of the storage device 51 may monitor the memory state of memory devices 100a to 100h, 101a, and 101b through the plurality of channels CH1 and CH2. When the memory controller 200 determines that a write operation on any one of the memory devices is to be performed, the memory controller 200 may select a memory device on which the write operation is to be performed (among the memory devices 100a to 100h, 101a, and 101b through the plurality of channels CH1 and CH2) based on the memory state. For example, when the memory state is a first state, the memory controller 200 may select any one of the main memory devices 100a to 100h and may generate a program command for allowing the selected memory device to perform the write operation. When the memory state is a second state, the memory controller 200 may select any one of the main memory devices 100a to 100h and the reserved memory devices 101a and 101b and may generate a program command for allowing the selected memory device to perform the write operation.

The memory state, when used as a reference for selecting a memory device, may be different among embodiments. In one embodiment, the memory state may be a number of free blocks $N_{FB}$ among the memory blocks in the main memory devices 100a to 100h. In another embodiment, the memory state may be a size of all valid data $D_{VLD}$ stored in the plurality of memory devices 100a to 100h, 101a, and 101b. In another embodiment, the memory state may be a representative Erase-Write (E/W) value $C_{EW}$ of memory blocks in the main memory devices 100a to 100h. The representative E/W value $C_{EW}$ may be a representative value of E/W count values of each of the memory blocks included in the main memory devices 100a to 100h.

The E/W count value may be a value representing how many times a specific memory block has gone through an erase operation and a data write operation, e.g., an erase-write cycle after a storage device was produced. The E/W count value may be counted for each memory block.

In an embodiment, the representative E/W value $C_{EW}$ may be variously determined. In one example, the representative E/W value $C_{EW}$ may be a maximum value among the E/W count values of each of the memory blocks in the main memory devices 100a to 100h. In another example, the representative E/W value $C_{EW}$ may be a mean value of the E/W count values of each of the memory blocks in the main memory devices 100a to 100h. In another example, the representative E/W value $C_{EW}$ may be a median value of the E/W count values of each of the memory blocks in the main memory devices 100a to 100h. In another embodiment, the representative E/W value $C_{EW}$ may be a minimum value among the E/W count values of each of the memory blocks in the main memory devices 100a to 100h.

In accordance with the embodiment, the memory controller 200 may select a memory device on which the write operation is to be performed among only the main memory devices 100a to 100h, or may select a memory device on which the write operation is to be performed among the main memory devices 100a to 100h and the reserved memory devices 101a and 101b, based on the memory state. Accordingly, channels can be used as efficient as possible under a structure in which different numbers of ways are coupled with respect to the channels.

FIG. 8 is a block diagram illustrating memory controller 200 in accordance with an embodiment. Referring to FIG. 8, the memory controller 200 may include a memory state monitor 210 and a write operation controller 230. The memory state monitor 210 may monitor the current state of the plurality of memory devices 100a to 100h, 101a, and 101b in the storage device 51. The memory state monitor 210 may generate memory state information $INF_{MS}$, based on the monitoring result, and transfer the memory state information $INF_{MS}$ to the write operation controller 230.

The memory state information $INF_{MS}$ may serve as a reference for selecting a memory device on which a write operation is to be performed. In some embodiments, the memory state information $INF_{MS}$ may be variously determined. In one embodiment, the memory state information $INF_{MS}$ may be information representing a number of free blocks $N_{FB}$ among the memory blocks in the main memory devices 100a to 100h. In another embodiment, the memory state information $INF_{MS}$ may be information representing a size of all valid data $D_{VLD}$ stored in the plurality of memory devices 100a to 100h, 101a, and 101b. In another embodiment, the memory state information $INF_{MS}$ may be information representing a representative value of E/W count values $C_{EW}$ of the memory blocks in the main memory devices 100a to 100h.

The write operation controller 230 may control a write operation of the plurality of memory devices 100a to 100h, 101a, and 101b in the storage device. For example, the write operation controller 230 may determine a memory device on which the write operation is to be performed based on the memory state information $INF_{MS}$ received from the memory state monitor 210. Also, the write operation controller 230 may transfer a program command $CMD_{PGM}$ to the determined memory device. In one embodiment, the write operation controller 230 may transfer program data to the memory device to which the program command $CMD_{PGM}$ is transferred. The memory device receiving the program command $CMD_{PGM}$ and the program data may perform a program operation.

FIG. 9 is a block diagram illustrating an embodiment of the write operation controller 210 shown in FIG. 8. Referring to FIG. 9, the write operation controller 230 may include a write position determiner 231, a command generator 233, and a map data storage 235. The write position determiner 231 may receive memory state information $INF_{MS}$ from the memory state monitor 210 and may receive map data $DATA_{MP}$ from the map data storage 235. The map data $DATA_{MP}$ may include data representing a logical address-physical address mapping relationship of data stored in the plurality of memory devices 100a to 100h, 101a, and 101b in the storage device 51.

In one embodiment, the map data $DATA_{MP}$ may include data about a free block or an open block among the memory blocks in the plurality of memory devices 100a to 100h, 101a, and 101b in the storage device 51. The free block may correspond to a memory block in which data has not yet been stored after an erase operation. The open block may correspond to a memory block in which data has been stored in some space while in other spaces data has not yet been stored. The write position determiner 231 may determine a position at which the data is to be stored based on the memory state information $INF_{MS}$ and map data $DATA_{MP}$.

For example, the write position determiner 231 may determine to which memory device the data is to be programmed among the plurality of memory devices 100a to 100h, 101a, and 101b, based on the memory state information $INF_{MS}$. Also, the write position determiner 231 may determine to which memory block the data is to be programmed among a plurality of memory blocks in the determined memory device. The write position determiner 231 may generate address information $INF_{ADDR}$ including data about the determined memory device and the determined memory block. The address information $INF_{ADDR}$ generated may be transferred to the command generator 233.

The command generator 233 may generate a program command $CMD_{PGM}$, based on the received address information $INF_{ADDR}$. The generated program command $CMD_{PGM}$ may be transferred to a memory device corresponding to the address information $INF_{ADDR}$. In this process, program data may be transferred together with the program command $CMD_{PGM}$ to the memory device. The memory device receiving the program command $CMD_{PGM}$ and the program data may perform a program operation.

The command generator 233 may transfer the program command $CMD_{PGM}$ to the memory device and may transfer map update data $DAT_{MU}$ corresponding thereto to the map data storage 235. Since data is to be written to any one memory device among the plurality of memory devices 100a to 100h, 101a, and 101b, a logical address-physical address mapping relationship associated with the data may be updated. The map data storage 235 may update map data by receiving the map update data $DAT_{MU}$.

In accordance with one embodiment, in the memory controller 200 the write position determiner 231 may select a memory device on which the write operation is to be performed among only the main memory devices 100a to 100h, or may select a memory device on which the write operation is to be performed among the main memory devices 100a to 100h and the reserved memory devices 101a and 101b, based on the memory state information $INF_{MS}$. Accordingly, channels can be used as efficiently as possible under a structure in which different numbers of ways are coupled with respect to the channels.

FIG. 10 is a flowchart illustrating an operating method of the memory controller 200 in accordance with an embodiment. Referring to FIG. 10, the operating method may include, at S110, determining that a write operation is to be performed on any one of a plurality of memory devices 100a to 100h, 101a, and 101b including first memory devices 100a to 100h and second memory devices 101a and 101b. At S130, an operation is performed of selecting a memory device on which the write operation is to be performed among the first memory devices 100a to 100h and the second memory devices 101a and 101b, based on a memory state of the plurality of memory devices 100a to 100h, 101a, and 101b. At S150, an operation is performed of generating a program command $CMD_{PGM}$ for controlling the selected memory device to perform the write operation.

In S110, the memory controller 200 may determine that a write operation is to be performed on any one of the memory devices 100a to 100h, 101a, and 101b in the storage device 51. This write determination may be generated based on a write request received from the host 300. For example, when the host 300 transfers write data and a write request to the storage device 51, the memory controller 200 may determine that an operation of writing the received write data to any one of the memory devices 100a to 100h, 101a, and 101b is to be performed. Operation S110 may be performed in response to the write request from the host 300.

The write determination according to S110 may be internally generated in the storage device 51, regardless of any request from the host 300. For example, a garbage collection operation, a wear leveling operation, a data refresh operation, or the like, may be performed by determination of the memory controller 200 regardless of any request from the host 300. The garbage collection operation, the wear leveling operation, the data refresh operation, or the like, may include, for example, an operation of writing data to the memory devices 100a to 100h, 101a, and 101b. Therefore, in order to maintain and repair data stored in the storage device 51 or maintain performance of the memory devices 100a to 100h, 101a, and 101b in the storage device 51, the memory controller 200 may determine that data is to be written to any one of the memory devices 100a to 100h, 101a, and 101b regardless of any request from the host 300.

In S130, the memory controller 200 may select a memory device, on which the write operation is to be performed among the first memory devices 100a to 100h and the second memory devices 101a and 101b, based on a memory state of the plurality of memory devices 100a to 100h, 101a, and 101b. In S130, the write operation controller 230 may receive memory state information $INF_{MS}$ from the memory state monitor 210, and select a memory device on which the write operation is to be performed, based on the memory state information $INF_{MS}$. In accordance with one embodiment of the operating method of the memory controller 200, the write operation controller 230 selects a memory device on which the write operation is to be performed among only the main memory devices 100a to 100h, or selects a memory device on which the write operation is to be performed among the main memory devices 100a to 100h and the reserved memory devices 101a and 101b, based on the memory state information $INF_{MS}$. Accordingly, channels can be used as efficiently as possible under a structure in which different numbers of ways are coupled with respect to the channels. Various embodiments of S130 will be described with reference to FIGS. 11, 14, and 15.

In S150, the write operation controller 230 of the memory controller 200 may transfer a program command and program data to the selected memory device. The memory device receiving the program command and the program data may perform a write operation on the corresponding data.

FIG. 11 is a flowchart illustrating an embodiment of operation S130 shown in FIG. 10. Referring to FIG. 11, in S131, the write position determiner 231 may refer to a number $N_{FB}$ of free blocks among memory blocks in the first memory devices 100a to 100h. The number $N_{FB}$ of free blocks may be memory state information $INF_{MS}$ received from the memory state monitor 210. In S133, the write position determiner 231 may determine whether the received number $N_{FB}$ of free blocks is smaller than a predetermined first threshold value NTH.

When the number $N_{FB}$ of free blocks is less than the first threshold value $N_{TH}$ (e.g., S133, YES), the write position determiner 231 may select a memory device including a free block among the first memory devices 100a to 100h and the second memory devices 101a and 101b (S135).

When the number $N_{FB}$ of free blocks is greater than or equal to the first threshold value $N_{TH}$ (e.g., S133, NO), the write position determiner 231 may select a memory device including a free block among the first memory devices 100a to 100h (S137).

When the number $N_{FB}$ of free blocks is greater than or equal to the first threshold value $N_{TH}$, this may indicate that a relatively large number of free blocks corresponding to the main data area remains. Therefore, a write operation may be performed by selecting any one of the first memory devices 100a to 100h constituting the main data area without using the over provisioning area.

When the number $N_{FB}$ of free blocks is less than the first threshold value $N_{TH}$, this may indicate that a relatively small number of free blocks corresponding to the main data area remains. Therefore, the second memory devices 101a and 101b constituting the over provisioning area, in addition to the first memory devices 100a to 100h, may also be selected as memory devices on which the write operation is to be performed.

According to the embodiment shown in FIG. 11, in the storage device in which different numbers of reserved memory devices are coupled with respect to channels, the write operation is performed on memory devices corresponding to the main data area when a number of free blocks sufficiently remain in the main data area. Thus, the reserved memory devices are not used in the write operation and workload can be equally distributed with respect to the channels. Accordingly, the channels can be efficiently used and the operating speed of the storage device 51 can be improved.

In accordance with the embodiment, in the storage device in which different numbers of reserved memory devices are coupled with respect to channels, the write operation is performed not only on memory devices corresponding to the main data area, but also on memory devices corresponding to the reserved area (e.g., the over provisioning area) when a number of free blocks does not sufficiently remain in the main data area. Thus, an insufficient storage space of the main data area can be supplemented by using a storage space of the reserved area.

FIGS. 12A and 12B are diagrams illustrating an operating method of the memory controller which is shown in FIGS. 10 and 11 according to one or more embodiments.

FIG. 12A illustrates a method for selecting a memory device for a write operation when the number $N_{FB}$ of free blocks is greater than or equal to the first threshold value $N_{TH}$. As shown in FIG. 12A, when the number $N_{FB}$ of free blocks is greater than or equal to the first threshold value $N_{TH}$ ($N_{FB} \geq N_{TH}$), the memory controller 200 may transfer a program command $CMD_{PGM}$ to any one of the memory devices 100a to 100h constituting the first data area 105. In the situation in which the number $N_{FB}$ of free blocks is greater than or equal to the first threshold value $N_{TH}$, the memory controller 200 may transfer the program command to only the memory devices 100a to 100h constituting the first data area 105. Since each of the first channel CH1 and the second channel CH2 is coupled to four main memory devices 100a to 100h, workload from the memory controller 200 can be equally distributed to the first channel CH1 and the second channel CH2.

FIG. 12B illustrates a method for selecting a memory device for a write operation when the number $N_{FB}$ of free blocks is smaller than the first threshold value $N_{TH}$. As shown in FIG. 12B, when the number $N_{FB}$ of free blocks is less than the first threshold value $N_{TH}$ ($N_{FB} < N_{TH}$), the memory controller 200 may transfer a program command $CMD_{PGM}$ to any one of the memory devices 100a to 100h constituting the first data area 105 and the memory devices 101a and 101b constituting the second data area 107. When the number $N_{FB}$ of free blocks is less than the first threshold value $N_{TH}$, the memory controller 200 may transfer the program command to the memory devices 100a to 100h, 101a, and 101b constituting the first and second data areas 105 and 107.

Since the first channel CH1 is coupled to four main memory devices 100a to 100d and the second channel CH2 coupled to four main memory devices 100e to 100h and two reserved memory devices 101a and 101b, a workload from the memory controller 200 may be further added to the second channel CH2 than the first channel CH1. However, the workload may be equally distributed to the first channel CH1 and the second channel CH2. When the number $N_{FB}$ of free blocks is less than the first threshold value $N_{TH}$ ($N_{FB} < N_{TH}$), this may indicate that a number of free blocks belonging to the main data area 105 is insufficient, and hence the memory devices 101a and 101b corresponding to the reserved area 107 (e.g., the over provisioning area) are also used for data write. Thus, all the memory blocks in the storage device 51 can be efficiently used.

FIG. 13 is a flowchart illustrating an embodiment of a method for starting a garbage collection operation. Referring to FIG. 13, first, the memory controller 200 may monitor a number $N_{FB}$ of free blocks among the memory blocks included in the first memory devices 100a to 100h (S210). The memory controller 200 may determine whether the number $N_{FB}$ of free blocks is less than a predetermined second threshold value $N_{GB}$ (S230).

When the number $N_{FB}$ of free blocks is less than the predetermined second threshold value $N_{GB}$ (e.g., S230, YES), a garbage collection operation may be performed on the plurality of memory devices 100a to 100h, 101a, and 101b in the storage device 51 (S250). The garbage collection operation may be performed in a manner that transfers and stores, in a free block, valid data of memory blocks (e.g., sacrificial memory blocks in which a number of valid pages is equal to or less than a certain ratio among the memory blocks in the storage device) and then invalidates the valid data stored in the sacrificial memory blocks. Meanwhile, the garbage collection operation may include an operation of erasing the sacrificial memory blocks.

When the number $N_{FB}$ of free blocks is greater than or equal to the predetermined second threshold value $N_{GB}$ (e.g., S230, NO), the garbage collection operation is not performed and monitoring operation S210 may be repeatedly performed.

In an embodiment, the first threshold value $N_{TH}$ used as a determination reference for operation S133 in the operating method shown in FIG. 11 and the second threshold value $N_{GB}$ used as a determination reference for operation S230 in the operating method shown in FIG. 13 may be values different from each other. The determination S133 of whether the write operation is to be performed on only the first memory devices or the first and second memory devices may be performed separately from the determination S230 of whether the garbage collection operation is to be performed.

In one embodiment, the first threshold value $N_{TH}$ used as a determination reference for operation S133 in the operating method shown in FIG. 11 and the second threshold value $N_{GB}$ used as a determination reference for operation S230 in the operating method shown in FIG. 13 may be the same value. The determination S133 of whether the write operation is to be performed on only the first memory devices or the first and second memory devices may be performed substantially identical to the determination S230 of whether the garbage collection operation is to be performed.

For example, when the number $N_{FB}$ of free blocks is greater than or equal to the first or second threshold value ($N_{TH} = N_{GB}$) (e.g., S133 or S230, NO), the memory controller 200 may allow the write operation to be performed on only the first memory devices 100a to 100h and the garbage collection operation is not performed.

When the number $N_{FB}$ of free blocks is smaller than or equal to the first or second threshold value ($N_{TH} = N_{GB}$) (e.g., S133 or S230, YES), the memory controller 200 may start performing the garbage collection operation and allow the write operation to be performed on all the first and second memory devices 100a to 100h, 101a, and 101b.

FIG. 14 is a flowchart illustrating another embodiment of operation S130 shown in FIG. 10. Referring to FIG. 14, in S132, the write position determiner 231 may refer to a size $D_{VLD}$ of all valid data stored in the plurality of memory devices 100a to 100h, 101a, and 101b. The size $D_{VLD}$ of valid data may be memory state information $INF_{MS}$ received from the memory state monitor 210. In S134, the write position determiner 231 may determine whether the received size $D_{VLD}$ of valid data is greater than a predetermined third threshold value $D_{TH}$.

When the size $D_{VLD}$ of valid data is greater than the predetermined third threshold value $D_{TH}$ (e.g., S134, YES), the write position determiner 231 may select a memory device including a free block among the first memory devices 100a to 100h and the second memory devices 101a and 101b (S136).

When the size $D_{VLD}$ of valid data is less than or equal to the predetermined third threshold value $D_{TH}$ (e.g., S134, NO), the write position determiner 231 may select a memory device including a free block among the first memory devices 100a to 100h (S138).

When the size $D_{VLD}$ of valid data is less than or equal to the predetermined third threshold value $D_{TH}$, this may indicate that a large amount of extra space corresponding to the main data area remains. Therefore, the write operation may be performed by selecting any one of the first memory devices 100a to 100h constituting the main data area, without using the over provisioning area.

When the size $D_{VLD}$ of valid data is greater than the predetermined third threshold value $D_{TH}$, this may indicate that a small amount of extra space corresponding to the main data area remains. Therefore, the second memory devices 101a and 101b constituting the over provisioning area may also be selected as memory devices on which the write operation is to be performed.

In accordance with the embodiment shown in FIG. 14, in the storage device in which different numbers of reserved memory devices are coupled with respect to channels, the write operation may be performed on memory devices corresponding to the main data area when an extra space sufficiently remains in the main data area. Thus, the reserved memory devices are not used in the write operation and workload can be equally distributed with respect to the channels. Accordingly, the channels can be efficiently used and the operating speed of the storage device 51 can be improved.

In accordance with one embodiment, in the storage device in which different numbers of reserved memory devices are coupled with respect to channels, the write operation is performed not only on memory devices corresponding to the main data area, but also on memory devices corresponding to the reserved area (e.g., the over provisioning area) when an extra space does not sufficiently remain in the main data area. Thus, insufficient storage space of the main data area can be supplemented by using a storage space of the reserved area.

FIG. 15 is a flowchart illustrating another embodiment of operation S130 shown in FIG. 10. Referring to FIG. 15, in S141, the write position determiner 231 may refer to a representative E/W value $C_{EW}$ of memory blocks in the first memory devices. As described above, the representative E/W value $C_{EW}$ may be variously determined. In an example, the representative E/W value $C_{EW}$ may be a maximum value among the E/W count values of each of the memory blocks in the main memory devices 100a to 100h. In another example, the representative E/W value $C_{EW}$ may be a mean value of the E/W count values of each of the memory blocks in the main memory devices 100a to 100h. In another example, the representative E/W value $C_{EW}$ may be a median value of the E/W count values of each of the memory blocks in the main memory devices 100a to 100h. In another embodiment, the representative E/W value $C_{EW}$ may be a minimum value among the E/W count values of each of the memory blocks in the main memory devices 100a to 100h.

When the representative E/W value $C_{EW}$ is greater than a predetermined fourth threshold value $C_{TH}$ (e.g., S143, YES), the write position determiner 231 may select a memory device including a free block among the first memory devices 100a to 100h and the second memory device 101a and 101b (S145).

When the representative E/W value $C_{EW}$ is less than or equal to the predetermined fourth threshold value $C_{TH}$ (S143, NO), the write position determiner 231 may select a memory device including a free block among the first memory devices 100a to 100h (S147).

When the representative E/W value $C_{EW}$ is less than or equal to the predetermined fourth threshold value $C_{TH}$, this may indicate that a large number of write operations or erase operations has not yet been performed after the storage device 51 was produced. This corresponds to an initial period of End-Of-Life (EOL) of the storage device 51. Therefore, the write operation may be performed by selecting any one of the first memory devices 100a to 100h constituting the main data area.

When the representative E/W value $C_{EW}$ is greater than the predetermined fourth threshold value $C_{TH}$, this may indicate that a relatively large number of write operations or erase operations has not yet been performed after the storage device 51 was produced. This corresponds to a middle or last period of EOL of the storage device 51. Therefore, the second memory devices 101a and 101b constituting the over provisioning area may also be selected as memory devices on which the write operation is to be performed.

In accordance with the embodiment shown in FIG. 15, when different numbers of reserved memory devices in the storage device are coupled with respect to the channels, the write operation may be performed on memory devices that correspond to the main data area in an initial period of EOL. Thus, the reserved memory devices may not be used in the write operation and workload can be equally distributed with respect to the channels. Accordingly, the channels can be efficiently used and the operating speed of the storage device 51 can be improved.

In accordance with the embodiment, when different numbers of reserved memory devices in the storage device are coupled with respect to the channels, the write operation may be performed not only on memory devices corresponding to the main data area but also on memory devices corresponding to the reserved area (e.g., the over provisioning area) in a middle or last period of EOL of the storage device 51. Thus, performing of the first memory devices 100a to 100h which otherwise would be degraded can be supplemented with the second memory devices 101a and 101b to improve performance.

FIG. 16 is a diagram illustrating another embodiment of a storage device 52, which may include a memory controller 200 and a plurality of memory devices 102a to 102h and 103a to 103c. The memory controller 200 may be included, for example, in a chip with outputs correspond to the channels CH1 and CH2 or the outputs may be coupled to logic performing the functions of the memory controller inside of a chip or other circuit.

The plurality of memory devices 102a to 102h and 103a to 103c may be arranged in a first data area 106 and a second data area 108. In one embodiment, the first memory devices 102a to 102h may be in the first data area 106 and the second memory devices 103a to 103c may in the second data area 108. Moreover, the first data area 106 (including the first memory devices 102a to 102h) may be a main data area for storing user data, and the second data area 108 (including the second memory devices 103a to 103c) may be a reserved area which does not store user data.

As shown in FIG. 16, the same number of main memory devices in storage device 52 may be coupled to each of channel CH1 and CH2. In this example, four main memory devices 102a to 102d are coupled to the first channel CH1 and four main memory devices 102e to 102h are coupled to the second channel CH2. At the same time, different numbers of reserved memory devices may be coupled to the channels. In the example shown in FIG. 16, one reserved memory device 103a is coupled to the first channel CH1 and two reserved memory devices 103b and 103c are coupled to the second channel CH2. Additionally, memory devices 102a to 102d and 103a may be coupled to the first channel CH1 through first to fifth ways WAY1 to WAY5, respectively, and memory devices 102e to 102h, 103b, and 103c may be coupled to the second channel CH2 through sixth to eleventh ways WAY6 to WAY11, respectively.

When comparing FIGS. 7 and 16, the numbers of reserved memory devices may differ in different storage device embodiments, e.g., storage device 51 or 52. Also, different numbers of reserved memory devices may be coupled with respect to the channels in different storage device embodiments, e.g., storage devices 51 or 52.

In accordance with one or more embodiments described herein, different numbers of reserved memory devices may be coupled to various channels in multi-channel and multi-way structures. A memory device on which a write operation is to be performed may be selected from the main memory devices 100a to 100h or 102a to 102h, or may be selected from the main memory devices 100a to 100h or 102a to 102h and the reserved memory devices 101a and 101b or 103a to 103c, based on a memory state. Accordingly, channels can be used as efficiently as possible when different numbers of ways are coupled to different channels.

Various embodiments with memory devices coupled to memory controllers through two channels are illustrated in FIGS. 7 and 16. Memory devices may be coupled to the memory controller through more than two channels in other embodiments. Also, four main memory devices are shown to be coupled to each channel in FIGS. 7 and 16. A different number of memory devices may be coupled to each channel in other embodiments.

FIG. 17 is a diagram illustrating another embodiment of the memory controller shown in FIG. 1. Referring to FIG.

17, a memory controller 1000 is coupled to a host and a memory device and is configured to access one or more memory devices in response to a request from the host. For example, memory controller 1000 may be configured to control read, program, erase, and background operations of the memory device. The memory controller 1000 may be configured to serve as an interface between the memory device and the host, and may drive firmware for controlling the memory device(s).

The memory controller 1000 may include a processor 1010, a memory buffer 1020, an error corrector 1030, a host interface 1040, a buffer controller 1050, a memory interface 1060, and a bus 1070. The bus 1070 may be configured to provide channels between components of the memory controller 1000.

The processor 1010 may control overall operations of the memory controller 1000 and may perform logical operations. The processor 1010 may communicate with an external host through the host interface 1040 and may communicate with the memory device through the memory interface 1060. Also, the processor 1010 may communicate with the memory buffer 1020 through the buffer controller 1050. The processor 1010 may control operation of the storage device using the memory buffer 1020 as a working memory, a cache memory, or a buffer memory.

The processor 1010 may function of a flash translation layer (FTL) that translates logical block addresses (LBAs) into corresponding physical block addresses (PBAs). For example, the FTL may translate LPAs to corresponding PBAs using a mapping table. Several address mapping methods may be used by the FTL, which method may use one or more mapping units. Examples of address mapping methods that may be used include a page mapping method, a block mapping method, and a hybrid mapping method.

In one embodiment, the processor 1010 may be configured to randomize data from the host. For example, the processor 1010 may randomize data from the host using a randomizing seed. The randomized data may then serve as the data to be stored to the memory device and to be programmed in the memory cell array. The processor 1010 may perform randomizing and derandomizing by driving software or firmware.

The memory buffer 1020 may be used as the working memory, the cache memory, or the buffer memory of the processor 1010. The memory buffer 1020 may store codes and commands executed by the processor 1010. The memory buffer 1020 may store data processed by the processor 1010, and may be, for example, a Static RAM (SRAM) or a Dynamic RAM (DRAM).

The error corrector 1030 may perform error correction code (ECC) operations. For example, the error corrector 1030 may perform ECC encoding on data to be written in the memory device through the memory interface 1060. The ECC encoded data may be transferred to the memory device through the memory interface 1060. The error corrector 1030 may perform ECC decoding on data received from the memory device through the memory interface 1060. In an example, the error corrector 1030 may be included as a component of the memory interface 1060 in the memory interface 1060.

The host interface 1040 may communicate with the external host under the control of the processor 1010, and may communicate with the host using at least one of various communication methods, protocols, or interfaces. Examples include a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a nonvolatile memory express (NVMe), a Universal Flash Storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

The buffer controller 1050 is configured to control the memory buffer 1020 under the control of the processor 1010.

The memory interface 1060 may communicate with the memory device under the control of the processor 1010, and may communicate commands, addresses, and data with the memory device through one or more channels.

The memory state monitor 210 and the write operation controller 230 (e.g., shown in FIG. 8) may be implemented with the processor 1010 and the memory buffer 1020, e.g., as shown in FIG. 17. The write position determiner 231 and the command generator 233 (e.g., as shown in FIG. 9) may be implemented with the processor 1010 shown in FIG. 17. In addition, the map data storage 235 (e.g., as shown in FIG. 9) may be implemented with the memory buffer 1020 shown in FIG. 17.

In an example, the processor 1010 may control operation of the memory controller 1000 using codes stored in a nonvolatile memory device (e.g., a read only memory (ROM)) in the memory controller 1000. In another example, the processor 1010 may load codes from the memory device through the memory interface 1060.

In an example, the bus 1070 of the memory controller 1000 may be divided into a control bus and a data bus. The data bus may be configured to transmit data in the memory controller 1000. The control bus may be configured to transmit control information such as commands and addresses in the memory controller 1000. The data bus and the control bus may be separated from each other, and in one embodiment may not interfere or influence each other. The data bus may be coupled to the host interface 1040, the buffer controller 1050, the error corrector 1030, and the memory interface 1060. The control bus may be coupled to the host interface 1040, the processor 1010, the buffer controller 1050, the memory buffer 1020, and the memory interface 1060.

FIG. 18 is a block diagram illustrating an embodiment of a Solid State Drive (SSD) system 3000 which includes a host 3100 and an SSD 3200. The SSD 3200 exchanges a signal SIG with the host 3100 through a signal connector 3001 and receives power PWR through a power connector 3002. The SSD 3200 includes an SSD controller 3210, a plurality of flash memories 3221 to 322n, an auxiliary power supply 3230, and a buffer memory 3240. In one implementation, the SSD controller 3210 may serve as the memory controller (e.g., 200 shown in FIG. 1).

The SSD controller 3210 may control the plurality of flash memories 3221 to 322n in response to a signal SIG from the host 3100. In an example, the signal SIG may be a signal based on an interface between the host 3100 and the SSD 3200. The signal SIG may be defined by at least one interface, examples of which include a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

Each of the flash memories 3221 to 322n may be configured with the memory device 100 as shown in FIG. 2 and may be coupled to a plurality of channels CH1, CH2, ..., and CHn. For example, the flash memories 3221 to 322n may be coupled to the SSD controller 3210 in a multi-channel and multi-way structure as in FIG. 7 or 16.

The auxiliary power supply 3230 is coupled to the host 3100 through the power connector 3002. When the supply of power from the host 3100 does not conform to a predetermined or desired pattern (e.g., is not smooth), the auxiliary power supply 3230 may provide power of the SSD 3200. The auxiliary power supply 3230 may be located in or external to the SSD 3200. In one embodiment, the auxiliary power supply 3230 may be located on a main board and may provide auxiliary power to the SSD 3200.

The buffer memory 3240 may operate as a buffer memory of the SSD 3200. For example, the buffer memory 3240 may temporarily store data received from the host 3100 and/or the plurality of flash memories 3221 to 322n, and/or may temporarily store meta data (e.g., a mapping table) of the flash memories 3221 to 322n. The buffer memory 3240 may include one or more volatile memories. Examples include a DRAM, an SDRAM, a DDR SDRAM, an LPDDR SDRAM, and a GRAM or nonvolatile memories such as a FRAM, a ReRAM, an STT-MRAM, and a PRAM.

FIG. 19 is a block diagram illustrating an embodiment of a user system which may include any of the embodiments of the storage device described herein. Referring to FIG. 19, the user system 4000 includes an application processor 4100, a memory module 4200, a network module 4300, a storage module 4400, and a user interface 4500. The application processor 4100 may drive components included in the user system 4000, an operating system (OS), a user program, or the like. In an example, the application processor 4100 may include one or more controllers for controlling components in the user system 4000, interfaces, a graphic engine, and the like. The application processor 4100 may be provided as a System-on-Chip (SoC).

The memory module 4200 may operate as a main memory, working memory, buffer memory, or cache memory of the user system 4000. For example, the memory module 4200 may include volatile random access memories such as a DRAM, an SDRAM, a DDR SDRAM, a DDR2 SDRM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. In an example, the application processor 4100 and the memory module 4200 may be provided as one semiconductor package by being packaged based on a Package on Package (PoP).

The network module 4300 may communicate with external devices. In an example, the network module 4300 may support wireless communications. Examples include Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. In an example, the network module 4300 may be in the application processor 4100.

The storage module 4400 may store data, for example, from the application processor 4100. In one embodiment, the storage module 4400 may transmit data stored therein to the application processor 4100. In an example, the storage module 4400 may be implemented with a nonvolatile semiconductor memory device. Examples include a Phase-change RAM (PRAM), a Magnetic RAM (MRAM), a Resistive RAM (RRAM), a NAND flash, a NOR flash, or a NAND flash having a three-dimensional structure. In an example, the storage module 4400 may be provided as a removable drive such as a memory card of the user system 4000 or an external drive.

In an example, the storage module 4400 may include a plurality of nonvolatile memory devices which may operate in the manner of the memory device described with reference to FIG. 2. The storage module 4400 may operate in the manner of the storage device described with reference to FIG. 1, 7, or 16. The plurality of nonvolatile memory devices in the storage module 4400 may be coupled to the application processor 4100, for example, in the multi-channel and multi-way structure described with reference to FIG. 7 or 16.

The user interface 4500 may include interfaces for inputting data or commands to the application processor 4100 and/or outputting data to an external device. Examples of the user interface 4500 include a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces such as a Liquid Crystal Display (LCD), an Organic Light Emitting Diode (OLED) display device, an Active Matrix OLED (AMOLED) display device, an LED, a speaker, and a monitor.

In accordance with one or more of the aforementioned embodiments, a memory controller is capable of efficiently performing a data storage operation in a multi-channel and multi-way structure. A storage device which includes such a memory controller is also provided.

While the present disclosure has been shown and described with reference to embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all steps may be selectively performed or part of the steps and may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, various embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein. The embodiments may be combined to form additional embodiments.

What is claimed is:

1. A storage device comprising:
   a main data area comprising a plurality of main memory devices including first memory devices coupled to a first channel and second memory devices coupled to a second channel, a number of the first memory devices being equal to a number of the second memory devices;

a reserved area comprising at least one reserved memory device coupled to the second channel, wherein the reserved area is only coupled through the second channel; and a memory controller coupled to the first channel and the second channel, wherein the memory controller is configured to, based on a memory state of each of the plurality of main memory devices, determine a memory device to perform a data write operation, the memory device being determined from the main data area in response to the memory state being a first state, and the memory device being determined from the main data area and the reserved data area in response to the memory state being a second state.

2. The storage device of claim 1, wherein the memory controller includes:
  a memory state monitor configured to identify memory state information representing the memory state; and
  a write operation controller configured to determine the memory device to perform the data write operation based on the memory state information and to output a program command to the determined memory device.

3. The storage device of claim 2, wherein the memory state information includes a number of free blocks among memory blocks included in the plurality of main memory devices, and wherein the write operation controller:
  determines a memory device on which the data write operation is to be performed, among the plurality of main memory devices and the at least one reserved memory device, in response to the number of free blocks being less than a predetermined threshold value; and
  determines a memory device, on which the data write operation is to be performed among the plurality of main memory devices, in response to the number of free blocks being greater than or equal to the threshold value.

4. The storage device of claim 2, wherein the memory state information includes a size of valid data stored in the plurality of main memory devices, and wherein the write operation controller:
  determines a memory device, on which the data write operation is to be performed among the plurality of main memory devices and the at least one reserved memory device, in response to the size of valid data being greater than a predetermined threshold value; and
  determines a memory device, on which the data write operation is to be performed among the plurality of main memory devices, in response to the size of valid data being less than or equal to the threshold value.

5. The storage device of claim 2, wherein the memory state information includes a representative erase-write count value of memory blocks included in the plurality of main memory devices and wherein the write operation controller:
  determines a memory device, on which the data write operation is to be performed among the plurality of main memory devices and the at least one reserved memory device, in response to the representative erase-write count value being greater than a predetermined threshold value; and
  determines a memory device, on which the data write operation is to be performed among the plurality of main memory devices, in response to the representative erase-write count value being less than or equal to the threshold value.

6. The storage device of claim 5, wherein the representative erase-write count value is one of a maximum value, a mean value, a median value, and a minimum value of erase-write count values of each of the memory blocks included in the plurality of main memory devices.

7. A memory controller coupled to a first channel and a second channel, the memory controller comprising:
  a memory state monitor configured to identify memory state information on a current state of each of a plurality of main memory devices included in a main data area, the plurality of main memory devices including first memory devices coupled to the first channel, and second memory devices coupled to the second channel, a number of the first memory devices being equal to a number of the second memory devices; and
  a write operation controller configured to, based on the memory state information, control a memory device, from among the plurality of main memory devices, to perform a data write operation, wherein the memory device is selected from the main data area in response to the memory state being a first state, and wherein the memory device is selected from the main data area and a reserved area comprising at least one reserved memory device in response to the memory state being a second state,
  wherein the at least one reserved memory device is coupled to the second channel, and wherein the reserved area is only coupled through the second channel.

8. The memory controller of claim 7, wherein the write operation controller includes:
  a write position determiner configured to, based on the memory state information, identify a memory device, from among the plurality of main memory devices, to perform the data write operation, or identify a memory device, from among the plurality of main memory devices and the at least one reserved memory device, to perform the data write operation, and output address information corresponding to the identified memory device; and
  a command generator configured to output a program command to the identified memory device based on the address information.

9. The memory controller of claim 8, wherein the write operation controller further includes a map data storage configured to store map data representing a logical address-physical address mapping relationship of data stored in the plurality of main memory devices and the at least one reserved memory device, and to provide the map data to the write position determiner,
  wherein the command generator outputs map update data corresponding to the program command to the map data storage, and
  wherein the map data storage updates the map data based on the map update data.

10. The memory controller of claim 9, wherein the memory state information includes a number of free blocks among memory blocks included in the plurality of main memory devices, and wherein the write position determiner:
  identifies a memory device, on which the data write operation is to be performed among the plurality of main memory devices and the at least one reserved memory device, in response to the number of free blocks being less than a predetermined threshold value; and identifies a memory device, on which the data write operation is to be performed among the plurality of main memory devices, in response to the number of free blocks being greater than or equal to the threshold value.

11. The memory controller of claim 9, wherein the memory state information includes a size of valid data stored in the plurality of main memory devices, and wherein the write position determiner:

identifies a memory device, on which the data write operation is to be performed among the plurality of main memory devices and the at least one reserved memory device, in response to the size of valid data being greater than a predetermined threshold value; and identifies a memory device, on which the data write operation is to be performed among the plurality of main memory devices, in response to the size of valid data being less than or equal to the threshold value.

12. The memory controller of claim 9, wherein the memory state information includes a representative erase-write count value of memory blocks included in the plurality of main memory devices, and wherein the write position determiner:

identifies a memory device, on which the data write operation is to be performed among the plurality of main memory devices and the at least one reserved memory device, in response to the representative erase-write count value being greater than a predetermined threshold value; and identifies a memory device, on which the data write operation is to be performed among the plurality of main memory devices, in response to the representative erase-write count value being less than or equal to the threshold value.

13. The memory controller of claim 12, wherein the representative erase-write count value is one of a maximum value, a mean value, a median value, and a minimum value of erase-write count values of each of the memory blocks included in the plurality of main memory devices.

14. A method for operating a memory controller coupled to a first channel and a second channel, the method comprising:

identifying a data write state of each of a plurality of main memory devices included in a main data area, the plurality of main memory devices including first memory devices coupled to the first channel, and second memory devices coupled to the second channel, a number of the first memory devices being equal to a number of the second memory devices;

based on the data write state, selecting a memory device to perform a data write operation, wherein the memory device is selected from the main data area in response to a memory state being a first state, and wherein the memory device is selected from the main data area and a reserved data area in response to the memory state being a second state; and outputting a program command for controlling the selected memory device to perform a data write operation, wherein the at least one reserved memory device is coupled to the second channel, and wherein the reserved area is only coupled through the second channel.

15. The method of claim 14, wherein selecting the memory device includes:

referring to a number of free blocks among memory blocks included in the plurality of main memory devices based on information on the data write state, selecting a memory device, on which the data write operation is to be performed among the plurality of main memory devices and the at least one reserved memory device, in response to the number of free blocks being less than a predetermined threshold value, and selecting a memory device, on which the data write operation is to be performed among the plurality of main memory devices, in response to the number of free blocks being greater than or equal to the threshold value.

16. The method of claim 14, wherein selecting the memory device includes:

referring to a size of valid data stored in the plurality of main memory devices based on information on the data write state, selecting a memory device, on which the data write operation is to be performed among the plurality of main memory devices and the at least one reserved memory device, in response to the size of valid data being greater than a predetermined threshold value, and selecting a memory device, on which the data write operation is to be performed among the plurality of main memory devices, in response to the size of valid data being less than or equal to the threshold value.

17. The method of claim 14, wherein selecting the memory device includes:

referring to a representative erase-write count value of memory blocks included in the plurality of main memory devices based on information on the data write state, selecting a memory device, on which the data write operation is to be performed among the plurality of main memory devices and the at least one reserved memory device, in response to the representative erase-write count value being greater than a predetermined threshold value, and selecting a memory device on which the data write operation is to be performed among the plurality of main memory devices in response to the representative erase-write count value being less than or equal to the threshold value.

18. The method of claim 17, wherein the representative erase-write count value is one of a maximum value, a mean value, a median value, and a minimum value of erase-write count values of each of the memory blocks included in the plurality of main memory devices.

* * * * *